US012700938B2

(12) United States Patent
Kurata

(10) Patent No.: US 12,700,938 B2
(45) Date of Patent: Aug. 4, 2026

(54) CLOCK PROCESSING DEVICE AND PROGRAM

(71) Applicant: SEIKO SOLUTIONS INC., Chiba (JP)

(72) Inventor: Yosuke Kurata, Chiba (JP)

(73) Assignee: SEIKO SOLUTIONS INC., Chiba (JP)

( * ) Notice: Subject to any disclaimer, the term of this patent is extended or adjusted under 35 U.S.C. 154(b) by 337 days.

(21) Appl. No.: 18/686,740

(22) PCT Filed: Apr. 25, 2022

(86) PCT No.: PCT/JP2022/018698
§ 371 (c)(1),
(2) Date: Feb. 26, 2024

(87) PCT Pub. No.: WO2023/032351
PCT Pub. Date: Mar. 9, 2023

(65) Prior Publication Data
US 2024/0380507 A1 Nov. 14, 2024

(30) Foreign Application Priority Data
Sep. 6, 2021 (JP) ................................. 2021-144808

(51) Int. Cl.
*H04J 3/06* (2006.01)
*H04L 43/0864* (2022.01)
(52) U.S. Cl.
CPC ........ *H04J 3/0661* (2013.01); *H04L 43/0864* (2013.01)
(58) Field of Classification Search
CPC .... H04J 3/0661; H04J 3/0667; H04L 43/0864
See application file for complete search history.

(56) References Cited

U.S. PATENT DOCUMENTS

| | | | |
|---|---|---|---|
| 2011/0153869 A1* | 6/2011 | Bryant | H04J 3/0664 |
| | | | 709/248 |
| 2021/0243093 A1* | 8/2021 | Attar | G06F 9/45558 |
| 2023/0231788 A1* | 7/2023 | Hande | H04W 28/02 |
| | | | 709/224 |

FOREIGN PATENT DOCUMENTS

| | | |
|---|---|---|
| JP | 2010028684 A | 2/2010 |
| JP | 2016025474 A | 2/2016 |

(Continued)

OTHER PUBLICATIONS

International Search Report of PCT/JP2022/018698 mailed Jul. 19, 2022, 5 pages.

(Continued)

*Primary Examiner* — Ricky Q Ngo
*Assistant Examiner* — Kabir U Jahangir
(74) *Attorney, Agent, or Firm* — BROOKS KUSHMAN P.C.

(57) ABSTRACT

In a clock processing device, a delay difference calculation unit calculates a first one-way delay difference that is a difference between the first one-way delay of a target message combination and a first temporary delay base, and calculates a second one-way delay difference that is a difference between the second one-way delay of the target message combination and a second temporary delay base. A reference value calculation unit calculates a reference values of a first one-way delay from the calculated first one-way delay difference and the first temporary delay base and calculate a reference value of the second one-way delay from the calculated second one-way delay difference and the second temporary delay base. An estimation unit calculates the first one-way delay from the round-trip delay of the target message combination and from a ratio determined (Continued)

according to the first one-way delay reference value and the
second one-way delay reference value.

6 Claims, 12 Drawing Sheets

(56) References Cited

FOREIGN PATENT DOCUMENTS

| | | | |
|----|----------------|----|--------|
| JP | 6684409 | B1 | 4/2020 |
| JP | 2020091134 | A | 6/2020 |
| JP | 7047164 | B1 | 4/2022 |

OTHER PUBLICATIONS

Choi et al., One-way delay estimation and its application. Computer
Communications, vol. 28, No. 7, pp. 819-828, 2005.
Kim et al., One-way delay estimation without clock sychronization,
IEICE Electronics Express, vol. 4, No. 23, pp. 717-723, 2007.

* cited by examiner

CLOCK PROCESSING DEVICE AND PROGRAM

CROSS-REFERENCE TO RELATED APPLICATIONS

This application is a U.S. national phase of International Application No. PCT/JP2022/018698, filed on Apr. 25, 2022, which claims priority to Japanese Patent Application No. 2021-144808, filed on Sep. 6, 2021, the disclosures of which are hereby incorporated in their entirety by reference herein.

TECHNICAL FIELD

The present disclosure relates to a clock processing device and a program, and more particularly, to a clock processing device and a program for adjusting a clock of the own device.

BACKGROUND ART

Conventionally, there are time servers that acquire time information from a reference clock, matches a precise clock of its own device, and distributes a time to a subordinate device.

The time server receives the time information from the reference clock, and recognizes a time difference between its own clock and the reference clock. The current rate of the own clock is usually determined by calculation based on the time difference.

Moreover, Non-Patent Document 1 discloses a practical one-way delay estimation method that utilizes a round-trip time (RTT). In the Non-Patent Document 1, the one-way delay is estimated for a target of an entire transmission control protocol (TCP). There is a retransmission time out (RTO) mechanism in the TCP for re-transmission, and the RTT is measured to set the RTO. Moreover, the publication of Japanese Patent No. 6684409 estimates one-way delay using two internal clocks.

Non-Patent Document 1: One-way Delay Estimation and its Application by J. H. Choi, and C. Yoo in Computer Communications, Vol. 28, No. 7, pp. 819-828, 2005.

SUMMARY OF INVENTION

Technical Problem

In time synchronization in a packet-exchanging method used in a network time protocol (NTP) and a precision time protocol (PTP), time stamps are exchanged between a server and a client as illustrated in FIG. 12 in order to know a one-way delay from the server to the client and a time difference between the server and the client. This exchange method is referred to as a $T_1$-$T_4$ method for convenience.

In this method, a one-way delay is calculated as follows.

$$D(t_4) = \frac{(t_4 - t_1) - (T_3 - T_2)}{2} \quad (1)$$

The newest $t_1$, $T_2$, $T_3$, $t_4$ are required for the calculation, and the calculation is enabled immediately after $t_4$ is acquired.

In the $T_1$-$T_4$ method, it is assumed that each one-way delay is the same in the upstream and the downstream. Since all of $t_1$, $T_2$, $T_3$, and $t_4$ have been known at the time $t_4$ is known, a time difference $O(t_4)$ between the server and the client at that time is calculated as follows.

$$O(t_4) = (T_3 + D(t_4)) - t_4$$
$$= \frac{(T_2 - t_1) + (T_3 - t_4)}{2}$$

Therefore, in a case where the one-way delay is different between the upstream and the downstream, the time difference is incorrect. However, in this method, even if the clocks of the server and the client do not match, a reasonably accurate one-way delay can be obtained.

In particular, in the case of the NTP, about 1 millisecond is assumed as accuracy and precision of time synchronization, and such a calculation error of the one-way delay is often negligible unless the server is extremely far away. However, in the case of the PTP, it is often so large that it cannot be ignored.

The present disclosure has been made to solve the above problems, and an objective of the present disclosure is to provide a clock processing device and a program capable of accurately obtaining a one-way delay even in a case where the one-way delay is different between upstream and downstream.

Solution to Problem

A first aspect of the present disclosure is a clock processing device configured including a clock unit, a communication unit, a round-trip delay calculation unit, a minimum round-trip delay calculation unit, a temporary delay base calculation unit, a delay difference calculation unit, a reference value calculation unit, and a delay estimation unit. The clock unit outputs current time information. The communication unit receives a first message containing time information of a reference clock from a reference clock device, transmits to the reference clock device a second message containing time information of the clock unit, and receives time information of the reference clock when the second message has received. The round-trip delay calculation unit calculates, as a round-trip delay for every combination of the first message and the second message, a sum of a first one-way delay that is a difference between the time information of the reference clock contained in the first message and the time information of the clock unit when the first message was received, and a second one-way delay that is a difference between the time information contained in the second message and the time information of the reference clock when the second message was received. The minimum round-trip delay calculation unit calculates a minimum time of the round-trip delay from the calculated round-trip delays. The temporary delay base calculation unit calculates a first temporary delay base that is a first one-way delay and a second temporary delay base that is a second one-way delay from the combination giving the minimum time of the round-trip delay. The delay difference calculation unit calculates a first one-way delay difference that is a difference between the first one-way delay of a target message combination and the first temporary delay base, and calculates a second one-way delay difference that is a difference between the second one-way delay of the target message combination and the second temporary delay base. The reference value calculation unit calculates a reference value of the first one-way delay from the calculated first one-way delay difference and the first temporary delay base and calculate a reference value of the second one-way delay from the calculated second one-way delay difference and the second temporary delay base. The delay estimation unit calculates the first one-way delay or the second one-way delay from the round-trip delay of the target message combination and from a ratio determined according to the first one-way delay reference value and the second one-way delay reference value.

A second aspect of the present disclosure is a program. The program causes a computer to function as each unit of the clock processing device of the first aspect.

The present disclosure enables one-way delays to be found with good precision even in cases in which upstream and downstream one-way delays are different.

DESCRIPTION OF EMBODIMENTS

Figure 1:
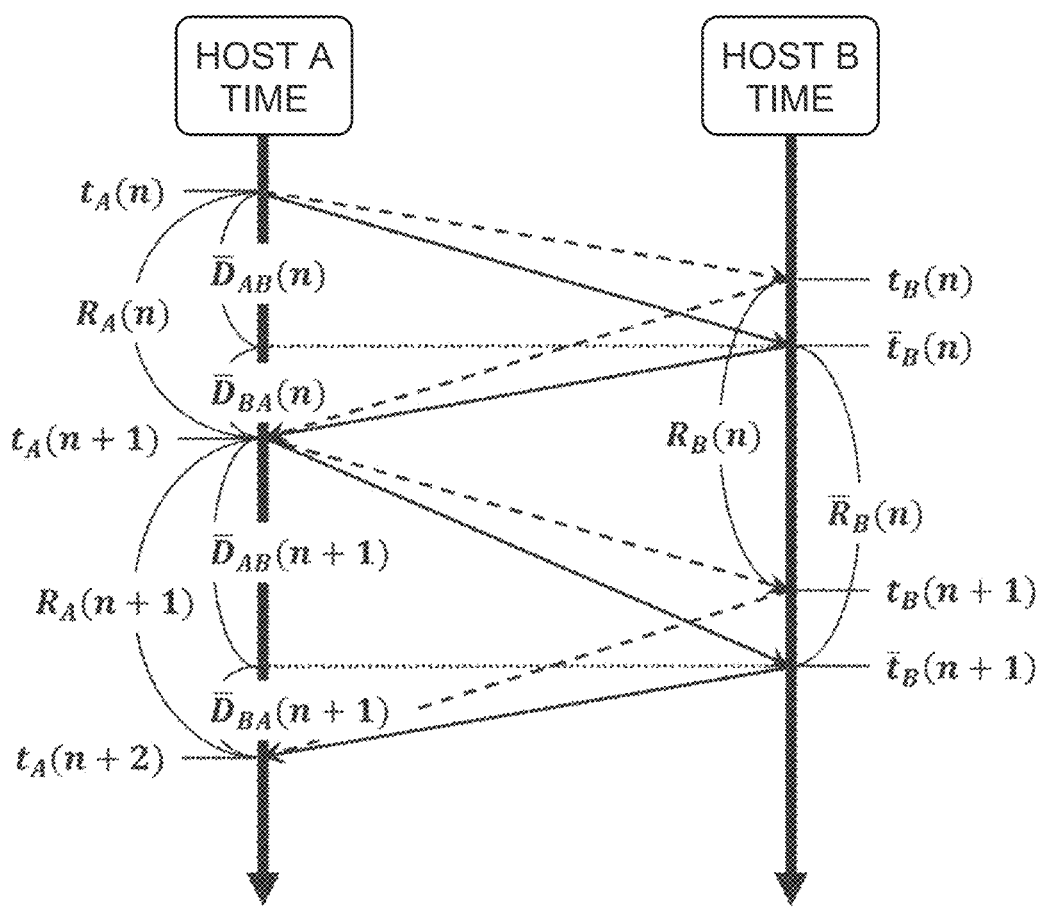
FIG. 1 is a diagram to explain a one-way delay and a round-trip delay.

Hereinafter, embodiments of the present disclosure will be described in detail with reference to the drawings.

Principle of Embodiment of Present Disclosure

First, a principle of an embodiment of the present disclosure will be described.

The PTP is a client server type time synchronization protocol similar to the NTP, and a PTP grand master (also referred to as a PTP master) as a reference clock device and a PTP slave can perform time synchronization with accuracy and precision of about several nanoseconds to several tens of nanoseconds. The reason why the PTP can perform time synchronization with such accuracy and precision is that the grand master and the slave uses hardware with extremely small fluctuation for time stamp.

Furthermore, in order to maintain such synchronization accuracy and precision, all intermediate network devices (router/L3 switch and L2 switch) between the grand master and the slave need to support the PTP. However, making all devices PTP compatible in this way is generally high cost. In particular, it is still easy to make the inside of a self-managed local area network (LAN) compatible with the PTP, but it is difficult to make all networks compatible with the PTP in a case where a non self-managed network is interposed between the grand master and the slave.

A network in which all network devices through which the PTP flows support the PTP is referred to as a PTP aware network, and the other networks are referred to as a PTP unaware network. In a case where the PTP is operated in the PTP unaware network, even if the grand master and the slave support the hardware time stamp, accuracy and precision decrease in the intermediate network, and there may be a possibility that synchronization accuracy generally decreases to the same level as that of the NTP. However, in a case where the intermediate network does not support the PTP, but is about several L2 switches having a low latency, it is highly likely that sufficient accuracy and precision can be secured.

In consideration of the above circumstances, the present embodiment provides a novel method to prevent a deterioration in synchronization accuracy/precision of a PTP master and PTP slave in a PTP unaware network. In a PTP protocol, time stamps/messages are exchanged in order to synchronize between the PTP master and the PTP slave. A difference in one-way delays can always be measured by such time stamps. In the present embodiment, a correct one-way delay is estimated based on differences of such one-way delays. In particular, the present embodiment enables to estimate a comparatively more exact one-way delay in a PTP unaware network than the existing methods hitherto, and as a result enables to raise a degree of accuracy/precision for time synchronization.

Antecedent Research

Non-Patent Documents 1, 2 include proposals for a practical one-way delay estimation method using RTT. In Non-Patent Document 1, a one-way delay is estimated for a generic TCP as the target, and not for a time synchronization protocol that is targeted in the present embodiment.

Non-Patent Document 2: One-way Delay Estimation Without Clock Synchronization by D. Kim, and J. Lee in IEICE Electronics Express, Vol. 4, No. 23, pp. 717-723, 2007.

Non-Patent Document 2 proposes a method to further raise the estimation precision of Non-Patent Document 1.

FIG. 1 is a diagram to understand the methods of Non-Patent Documents 1, 2. An exchange of messages between a host A and a host B are illustrated.

In FIG. 1, $t_A$, $t_B$ respectively represent times by a clock of the host A and times by a clock of the host B, with the clocks of the host A and the host B not necessarily being synchronized. In the following the clocks of the host A is, for convenience, referred to as the "correct" clock. Respective quantities are defined as follows.

$t_A(n)$ is a time indicated by the host A clock when an nth message is transmitted from the host A. Namely, $t_A(n)$ is a time when an n−1th reply has been received from the host B.

$t_B(n)$ is a time indicated by the host B clock when the nth message is received by the host B (and sent back to the host A at the same time).

5

$\bar{t}_B(n)$ is a correct time (time in the host A clock) when the nth message is received by the host B. Here, a variable X with a bar in the drawing or equations is expressed as X.

$\bar{D}_{AB}(n)$ is a one-way delay from the host A to the host B of the nth message. That is, $\bar{D}_{AB}(n)=\bar{t}_B(n)-t_A(n)$.

$\bar{D}_{BA}(n)$ is a one-way delay until a reply to the nth message arrives from the host B to the host A. That is, $\bar{D}_{BA}(n)=t_A(n+1)-\bar{t}_B(n)$.

$R_A(n)$ is an RTT by the host A clock of the nth message. That is, $R_A(n)=t_A(n+1)-t_A(n)$.

$R_B(n)$ is an RTT by the host B clock of the nth reply message. That is, $R_B(n)=t_B(n+1)-t_B(n)$.

$\bar{R}_B(n)$ is an RTT by a correct time (host A clock) of the nth reply message. That is, $\bar{R}_B(n)=\bar{t}_B(n+1)=\bar{t}_B(n)=\bar{D}_{BA}(n)+\bar{D}_{AB}(n+1)$.

$O_B(n)$ is an offset between the host B clock and the correct time (host A clock) when the nth message is received by the host B. That is, $O_B(n)=\bar{t}_B(n)-t_B(n)$.

Here, an important idea is that a difference in elapsed time between the host A clock and the host B clock is negligibly small if the elapsed time is up to about 100 milliseconds at the longest as in the RTT. In the case of FIG. 1, it is assumed that the following equation holds.

$$R_B(n) \approx \bar{R}_B(n)$$

Assuming as above, true one-way delay differences $\bar{J}_A(n)$ and $\bar{J}_B(n)$ in respective directions can be approximated and calculated as follows from the RTT.

$$\bar{J}_A = \bar{D}_{AB}(n+1) - \bar{D}_{AB}(n)$$
$$= \bar{R}_B(n) - R_A(n) \approx R_B(n) - R_A(n)$$
$$\bar{J}_B = \bar{D}_{BA}(n+1) - \bar{D}_{BA}(n)$$
$$= R_A(n+1) - \bar{R}_B(n) \approx R_A(n+1) - R_B(n)$$

The present inventor defines that $J_A(n)=R_B(n)-R_A(n)$, and $J_B(n)=R_A(n+1)-R_B(n)$. Since the one-way delay difference can be calculated as described above, when the initial one-way delay $\bar{D}_{AB}(0)$ or $\bar{D}_{BA}(0)$ is known, all the one-way delays are determined.

However, the initial one-way delay is not known from the RTT, and in Non Patent Literature 1, a possible range of $\bar{D}_{AB}(0)$ is determined for each of the three cases as follows.

Case 1: In the case of $\bar{D}_{AB}(0)>\bar{D}_{BA}(0)$:

$$\frac{R_A(1) - R_B(1) + R_B(0)}{2} < \bar{D}_{AB}(0) < R_A(0)$$

Case 2: In the case of $\bar{D}_{AB}(0)<\bar{D}_{BA}(0)$:

$$\frac{R_A(1) - R_B(1) + R_B(0)}{2} > \bar{D}_{AB}(0) > 0$$

Case 3: In the case of $\bar{D}_{AB}(0)=\bar{D}_{BA}(0)$:

$$\bar{D}_{AB}(0) = \frac{R_A(0)}{2}$$

6

Then, in a plurality of samples, when a $\bar{D}_{AB}$ value is 70% or more of the RTT, a midpoint $(R_A(1)-R_B(1)+R_B(0)+2R_A(0))/4$ of a range of Case 1 is adopted as $\bar{D}_{AB}(0)$, when the $\bar{D}_{AB}$ value is 30% or less, a midpoint $(R_A(1)-R_B(1)+R_B(0))/2$ of a range of Case 2 is adopted as $\bar{D}_{AB}(0)$, and when the $\bar{D}_{AB}$ value is neither greater than or equal to 70% of the RTT nor less than or equal to 30% of the RTT, $R_A(0)/2$ is adopted as $\bar{D}_{AB}(0)$.

On the other hand, in Non Patent Literature 2, first, in a case where $R_A(n)$ measurement and $R_A(n+1)$ measurement are performed within a short time, a time difference from the correct time of the host B clock is almost the same, that is, it is also assumed that the following equation holds.

$$O_B(n) \approx O_B(n+1)$$

Then, the present inventor focuses on $J_A(n)$ and $J_B(n)$. If the following equation holds, $$\frac{J_A(n)}{J_B(n)} \approx \frac{\bar{D}_{AB}(n)}{\bar{D}_{BA}(n)} \approx \frac{\bar{D}_{AB}(n+1)}{\bar{D}_{BA}(n+1)}$$

first, a proportional distribution value is temporarily placed as follows.

$$A(n) = R_A(n) \cdot \frac{J_A(n)}{J_A(n) + J_B(n)}$$
$$B(n) = R_A(n) - A(n)$$
$$A(n+1) = R_A(n+1) \cdot \frac{J_A(n)}{J_A(n) + J_B(n)}$$
$$B(n+1) = R_A(n+1) - A(n+1)$$

If the clocks of the host A and the host B are synchronized at this time, the following equations are satisfied.

$$A(n) = t_B(n) - t_A(n) \tag{3}$$
$$B(n) = t_A(n+1) - t_B(n)$$
$$A(n+1) = t_B(n+1) - t_A(n+1)$$
$$B(n+1) = t_A(n+2) - t_B(n+1)$$

In Non Patent Literature 2, assuming that Equation (3) holds even in a case where the clocks of the host A and the host B are not synchronized, it is considered that Equation (2) holds with an error.

Next, assuming that Equation (3) holds in a case where the synchronization is not established, an estimated time difference $O_{B.est}(n)$ is calculated as follows:

$$O_{B.est}(n) = \begin{cases} \min\{A(n), A(n+1)\} & \text{if } O_B(n) > 0 \\ -\min\{B(n), B(n+1)\} & \text{if } O_B(n) < 0 \end{cases}$$

In addition, the following equations are assumed.

$$\bar{D}_{AB}(n) = A(n) + O_{B.est}(n)$$

7

-continued $$^{-}D_{BA}(n) = B(n) - O_{B,est}(n)$$

$$^{-}D_{AB}(n+1) = A(n+1) + O_{B,est}(n)$$

$$^{-}D_{BA}(n+1) = B(n+1) - O_{B,est}(n) \quad (5)$$

What is important in this idea is that a time difference from the host B clock falls within a range in which Equation (3) holds and Equation (4) holds. On the other hand, Non Patent Literature 2 proposes the following determination conditions 1) to 3).

1) $R_A(n)$, $R_B(n)$, and $R_A(n+1)$ can be normally acquired.

2) Either $\{J_A(n)>0 \text{ and } J_B(n)>0\}$ or $\{J_A(n)<0 \text{ and } J_B(n)<0\}$ holds.

3) $t_A(n)<t_B(n)<t_A(n+1)<t_B(n+1)<t_A(n+2)$ holds.

In an implementation, the one-way delay is calculated only in a case where the above determination conditions are satisfied. These determination conditions are certainly necessary conditions for satisfying Equation (2). However, these are too obvious, and it seems that upstream and downstream delay ratios are generally determined in many cases in the DSL rather than that these determination conditions have a direct effect on the estimation of the one-way delay, and it is claimed that the one-way delay is estimated correctly with a high probability, if the above necessary conditions are met.

However, as can be seen from the first intention that Equation (3) is set, in short, it is just said that the one-way delay is selected such as the clocks of the host A and the host B are synchronized as much as possible. Such an idea is inappropriate as a method for time synchronization.

<Term Definition and Properties in PTP>

Figure 2:
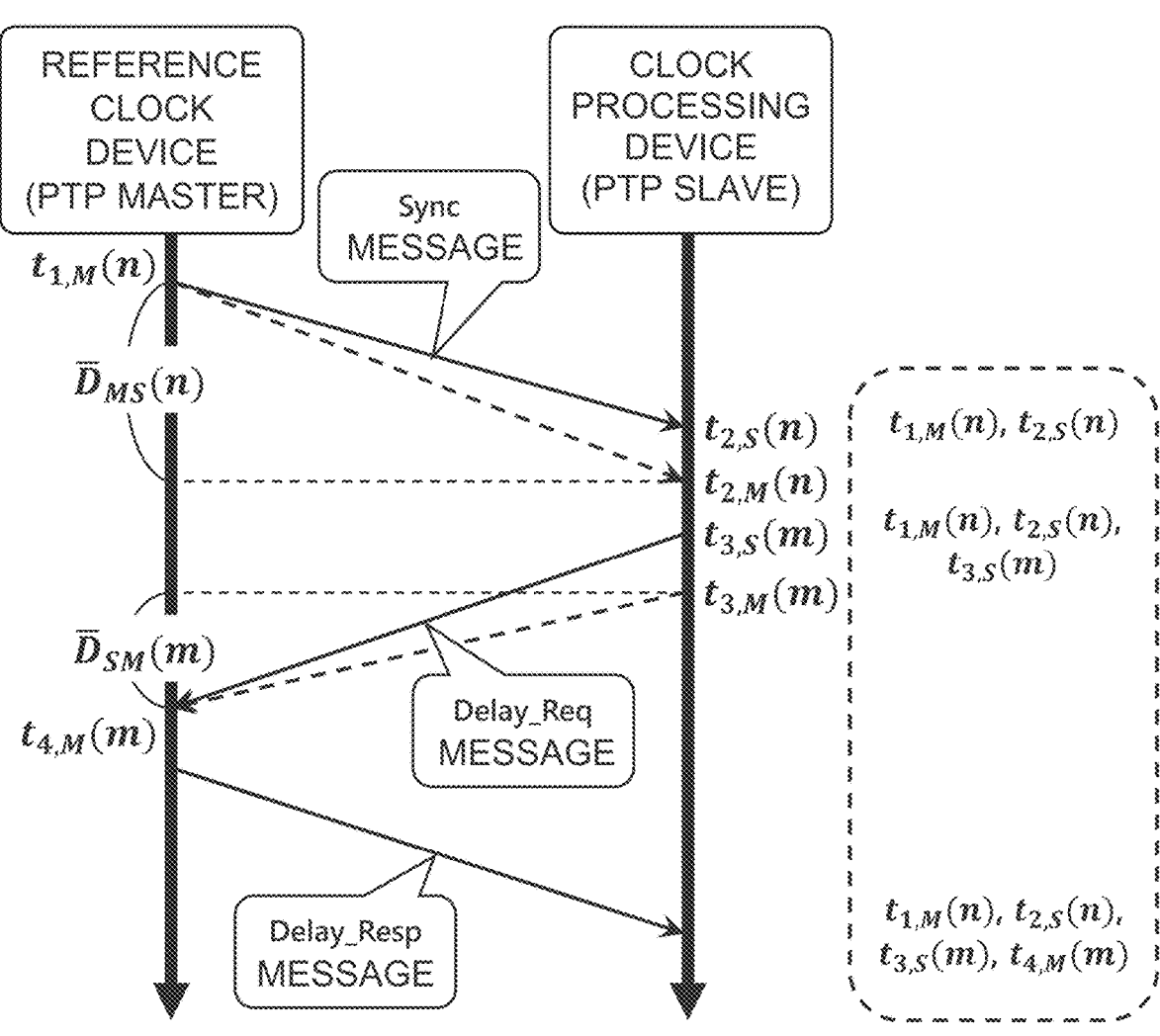
FIG. 2 is a diagram to explain a Sync message, a Delay__Req message, and a Delay_Resp message.

A method of simple calculation of the one-way delay in the time synchronization protocol is as shown in Equation (1) described above. In the case of the PTP, specifically, as illustrated in FIG. 2, a Sync message, a Delay_Req message, and a Delay_Resp message are exchanged. Various variables in the drawing follow those defined in FIG. 1.

The calculation of the most standard one-way delay D(n, m) and the time difference O(n, m) by using the nth Sync message and the mth Delay_Req message (Delay_Resp message) between the PTP master and the PTP slave are as follows.

$$D(n, m) = \frac{(t_{4,M}(m) - t_{1,M}(n)) - (t_{3,S}(m) - t_{2,S}(n))}{2}, \quad (5)$$

$$O(n, m) = (t_{1,M}(n) + D(n, m)) - t_{2,S}(n)$$

$$= \frac{(t_{1,M}(n) - t_{2,S}(n)) - (t_{4,M}(m) - t_{3,S}(m))}{2}$$

Figure 3:
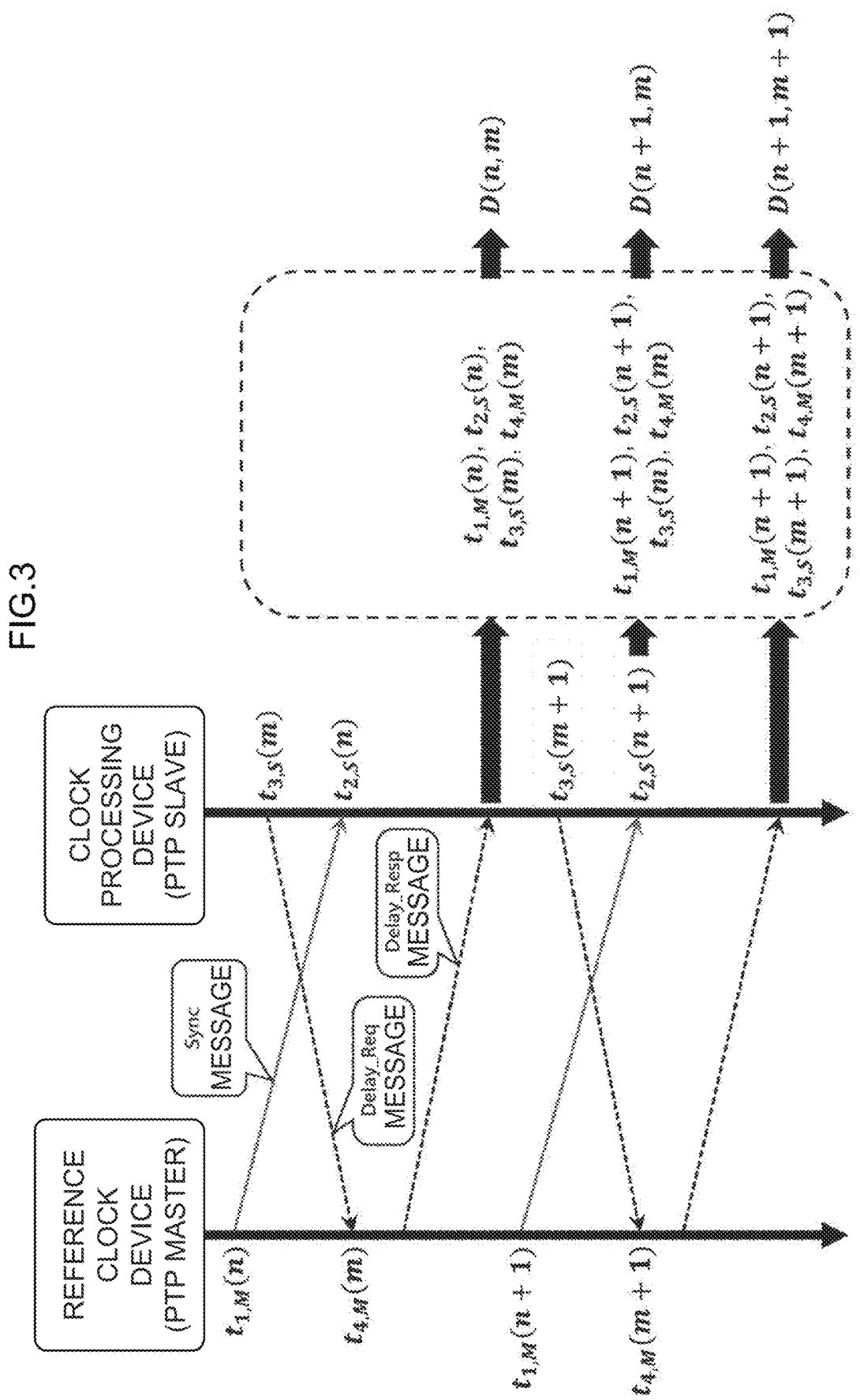
FIG. 3 is a diagram to explain respective examples of one-way delays calculated each time a message is received.

Furthermore, actually, as illustrated in FIG. 3, the acquisition of the $(t_{1,M})$, $t_{2,S}(\ )$ and the acquisition of the $(t_{3,S}(\ )$, $t_{4,M}(\ ))$ are done asynchronously. Therefore, the one-way delay $D=D(i, j)$ can be calculated by the latest $(t_{1,M}(\ ), t_{2,S}(\ ), t_{3,S}(\ ), t_{4,M}(\ ))$ at that time.

Meanwhile, in a case where the exchange between the Sync message and the Delay_Req message (Delay_Resp message) is performed asynchronously, the apparent RTT on a side of the PTP master using the nth Sync message and the mth Delay_Req message is calculated so that a response waiting time on a side of the PTP slave is eliminated as follows.

$$R_M(n, m) = (t_{4,M}(m) - t_{1,M}(n)) - (t_{3,S}(m) - t_{2,S}(n))$$

Note that the response waiting time on the side of the PTP slave is measured by the clock of the PTP slave.

Therefore, considering the apparent RTT for arbitrary n and m, there exist a case where the error is large with respect to the true RTT. In order to obtain the RTT as accurate as possible, it is necessary that the timings of reception of the Sync message and transmission of the Delay_Req message are sufficiently short.

For example, in a case where a rate of the clock of the PTP slave is deviated by +0.1 ppm with respect to a rate of the clock of the PTP master, when a period from $t_{2,S}(5)$ to $t_{3,S}(5)$, which is the fifth period in both the Sync message and the Delay_Req message, is 15 milliseconds, an error from the correct time of the period is +1.5 nanoseconds. With such an error, the PTP is at a negligible level (reliable RTT), but when a period from $t_{2,S}(5)$ to $t_{3,S}(20)$ is 30 seconds for the fifth Sync message and the twentieth Delay_Req message, an error from the correct time is ±3 microseconds, which is a non-negligible value. Here, the rate is a degree of advance or delay of the clock, and is, for example, a length (nanosecond) that makes faster or slower per second.

The apparent RTT $R_S(n, m)$ on the side of the PTP slave is similarly defined, but since $R_S(n, m)=(t_{2,S}(n)-t_{3,S}(m))-(t_{1,M}(n)-t_{4,M}(m))$, finally $$R_M(n, m) = R_S(n, m)$$

is obtained. From this, it is practically unnecessary to consider the side of the PTP master and the side of the PTP slave, and $R_M(n, m)$ and $R_S(n, m)$ are simply represented by R(n, m). The above results are summarized to obtain the following definitions.

(Definition 1 (Reliable RTT))

For a difference $|t_{3,S}(m)-t_{2,S}(n)|$ between a reception timing $t_{2,S}(n)$ of the nth Sync message and a transmission timing $t_{3,S}(m)$ of the mth Delay_Req message, if an error between this difference and the correct elapsed time is negligibly small, the present inventor calls $$R(n, m) = (t_{4,M}(m) - t_{1,M}(n)) - (t_{3,S}(m) - t_{2,S}(n))$$

a reliable RTT.

In the above Definition 1, in order to minimize the error between the value of $|t_{3,S}(m)-t_{2,S}(n)|$ and the correct elapsed time, it is of course necessary to reduce the error between the rate of the clock of the PTP master and the rate of the clock of the PTP slave, but it is also important that the value of the PTP slave clock is not step-adjusted (the step-adjustment is an adjustment of the value of the clock, which should generally increase linearly, by instantly changing the value, while ignoring the linear increase) between $t_{2,S}(n)$ and $t_{3,S}(m)$.

Finally, the present inventor will describe the one-way delay. Based on the definitions of the various quantities described above, the true one-way delay of the nth Sync message is $^{-}D_{MS}(n)$, and the true one-way delay of the mth Delay_Req message is $^-D_{SM}(m)$. The following properties are always established for both.

(Property 2)

For every n and m, $$^-D_{MS}(n) > 0 \text{ and } ^-D_{SM}(m) > 0$$

is always established.

Next, the true one-way delay difference (Jitter) $^-J_M$ can be calculated as follows.

$$^-J_M(n) = {}^-D_{MS}(n+1) - {}^-D_{MS}(n)$$

$$= \{(t_{2,S}(n+1) + O_{n+1}) - t_{1,M}(n+1)\} -$$

$$\{(t_{2,S}(n) + O_n - t_{1,M}(n)\}$$

Here, $O_{n+1}$ and $O_n$ are time offsets between the clocks of the PTP slave and the PTP master at time $t_{2,S}(n+1)$, and time $t_{2,S}(n)$, respectively.

A difference between the value of $t_{2,S}(n+1)-t_{2,S}(n)$ and the correct elapsed time from $t_{2,S}(n)$ to $t_{2,S}(n+1)$ is equal to $O_{n+1}-O_n$. Therefore, similarly to the reliable RTT, when the difference between the value of $t_{2,S}(n+1)-t_{2,S}(n)$ and the correct elapsed time from $t_{2,S}(n)$ to $t_{2,S}(n+1)$ is negligibly small, the following equation holds.

$$O_{n+1} \approx O_n$$

At this time, $^-J_M$ can be calculated from only time stamp information as follows.

$$\mathcal{J}_M(n) \approx (t_{2,S}(n+1) - t_{1,M}(n+1)) - (t_{2,S}(n) - t_{1,M}(n))$$

Now, the following definitions are obtained.

(Definition 3)

1) When the error between the value of $t_{2,S}(n+1)-t_{2,S}(n)$ and the correct elapsed time from $t_{2,S}(n)$ to $t_{2,S}(n+1)$ is negligibly small, the present inventor calls $$J_M(n) = (t_{2,S}(n+1) - t_{1,M}(n+1)) - (t_{2,S}(n) - t_{1,M}(n))$$

the reliable one-way delay difference of the Sync message.

2) When the error between the value of $t_{3,S}(m+1)-t_{3,S}(m)$ and the correct elapsed time from $t_{3,S}(m)$ to $t_{3,S}(m+1)$ is negligibly small, $$J_S(m) = (t_{4,M}(m+1) - t_{3,S}(m+1)) - (t_{4,M}(m) - t_{3,S}(m))$$

is referred to as a reliable one-way delay difference of the Delay_Req message.

Furthermore, when it is not necessary to distinguish the two types of messages, the two types of differences are simply referred to as a reliable one-way delay difference.

<Estimation of Delay Range by RTT and Delay Difference Sequence>

Using the terms and properties described above, the present inventor can show the following lemma first.

(Lemma 4)

Assume that there are integers of $n=n_1 < n_2 \ldots < n_p$ and $m=m_1 < m_2 < \ldots < m_p$, where $R(n_1, m_1)$, $R(n_2, m_2)$, ..., and $R(n_p, m_p)$ are all reliable RTTs, and all RTTs thereof are known. Also, the one-way delay difference between any two messages in each of the Sync message and the Delay_Req message is reliable, when one of $$R(i, j) \in \{R(n_1, m_1), R(n_2, m_2), \ldots, R(n_p, m_p)\}$$

is arbitrarily selected,

1) A number k that minimizes $^-D_{MS}(\ )$ among n, n+1, ..., $n_p-1$, $n_p$ is found, and a difference $J_M(i, k)$ between $^-D_{MS}(k)$ and $^-D_{MS}(i)$ is also found.

2) A number 1 that minimizes $^-D_{SM}(\ )$ among m, m+1, ..., $m_p-1$, $m_p$ is found, and a difference $J_S(j, 1)$ between $^-D_{SM}(1)$ and $^-D_{SM}(J)$ is also found.

Figure 4:
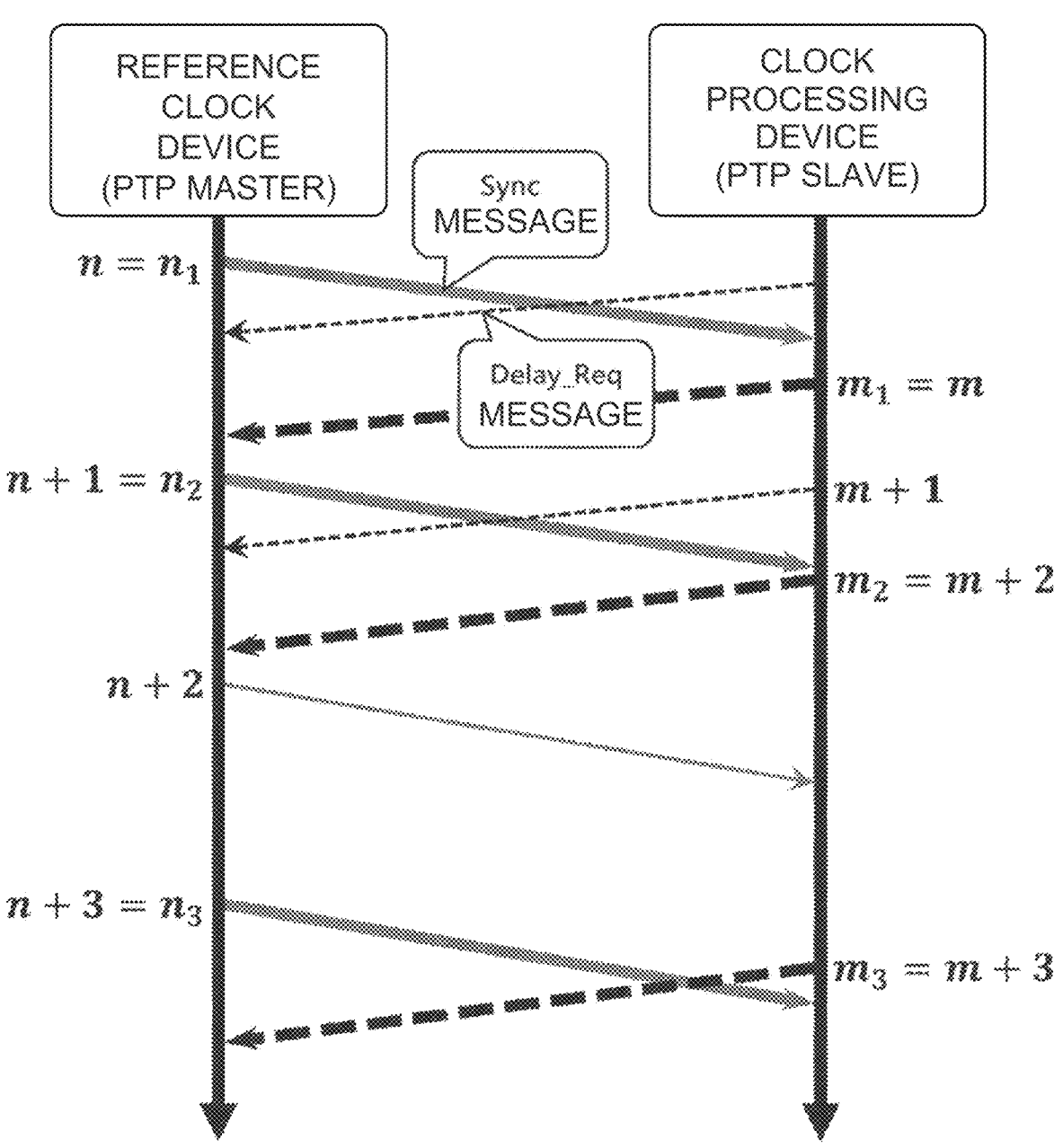
FIG. 4 is a diagram to illustrate an example of exchanges of Sync messages, Delay_Req messages, and Delay_Resp messages.

Before the proof, the present inventor will explain the assumed situation of the lemma in a little more detail. In general, both the Sync message and the Delay_Req message are exchanged asynchronously (FIG. 4). Therefore, there may be no corresponding Delay_Req message for a Sync message of any number, or conversely, two or more Delay-_Req messages may be corresponding to a Sync message. Thus, the associated number is subscripted like $(n_p, m_p)$ for easy understanding.

(Proof)

Show 1) of Lemma 4. Fix $q \neq (i)$ arbitrarily. When $q > i$, since the one-way delay difference between the ith and qth messages is reliable, which is obvious from Definition 3, a difference $J_{MS}(i, q)$ between $^-D_{MS}(i)$ and $^-D_{MS}(q)$ can be calculated as follows.

$$J_{MS}(i, q) = \overline{D}_{MS}(q) - \overline{D}_{MS}(i)$$

$$\approx J_M(i) + J_M(i+1) + \ldots + J_M(q-1).$$

For $q < i$, the present inventor can calculate it in the same manner. A minimum value of $J_{MS}(j, k) \leq 0$ among $J_{MS}(i, n)$, ..., $J_{MS}(i, p)$ corresponds to $D_{MS}(k)$.

2) of Lemma 4 is shown in the same way.

(Theorem 5 (Valid Delay Range))

Consider the same situation as in Lemma 4 and use the same letters. Then, establishing Property 2 for $n_1$, $n_1+1$, ..., $n_p$ and $m_1$, $m_1+1$, ..., $m_p$ is equivalent to establishing the following Equation for an arbitrary RTT $R(i, j)$ and minimum one-way delays $^-D_{MS}(k)$ and $^-D_{SM}(1)$.

$$J_M(k, i) < {}^-D_{MS}(i) < R(i, j) - J_S(1, j) \tag{6}$$

$$^-D_{MS}(j) = R(i, j) - {}^-D_{MS}(i)$$

Note that, the following Equations hold.

$$J_M(k, i) = -J_M(i, k) \approx \overline{D}_{MS}(i) - \overline{D}_{MS}(k) > 0$$

$$J_S(l, j) = -J_S(j, l) \approx \overline{D}_{SM}(j) - \overline{D}_{MS}(l) > 0$$

11

(Proof of Theorem 5)

Figure 5:
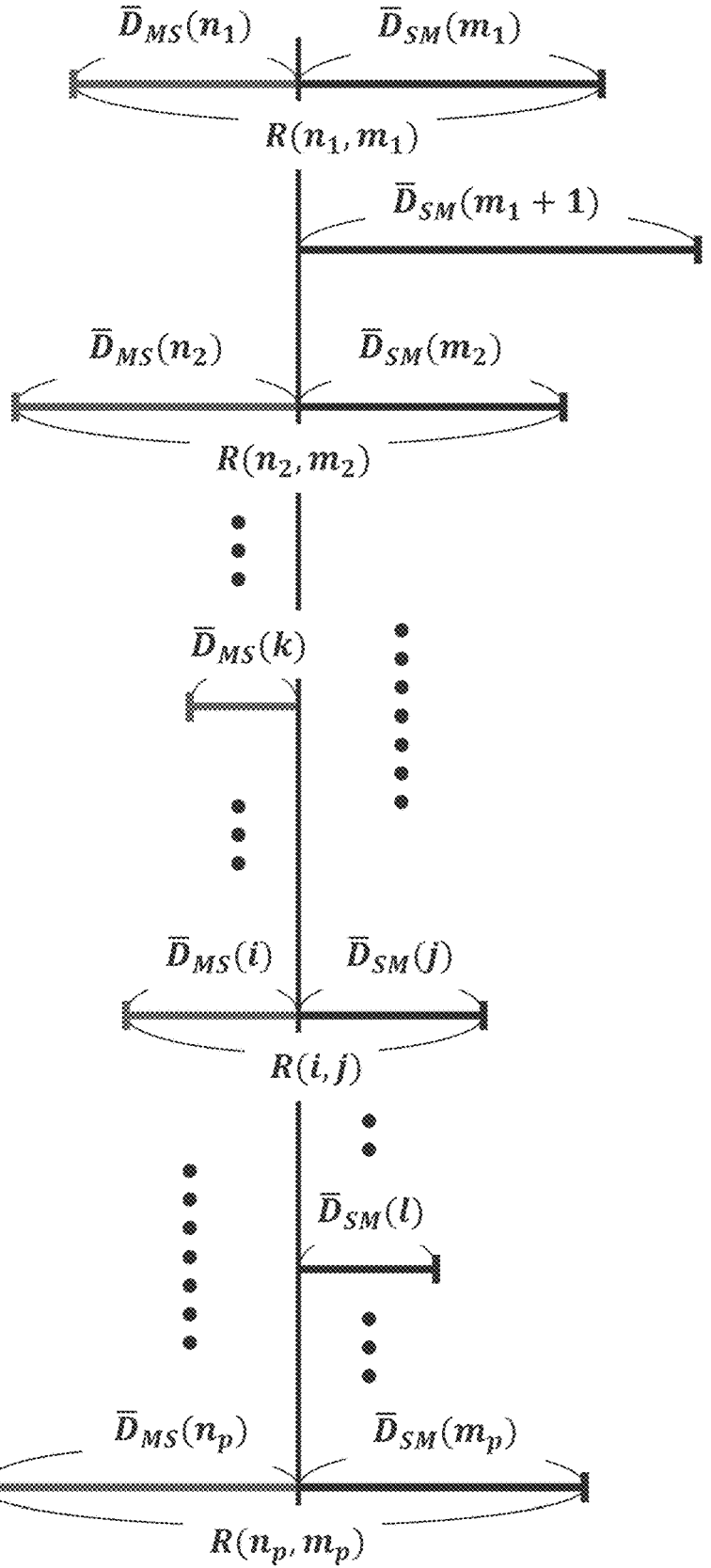
FIG. 5 is a diagram illustrating an example of one-way delays and round-trip delays.

The present inventor will prove theorem 5 with reference to FIG. 5,

The present inventor first shows Property 2=>Equation (6). Property 2 implies $^-D_{MS}(k)>0$. Since $^-D_{MS}(i)=^-D_{MS}(k)+J_M(k, i)$, $J_M(k, i)<^-D_{MS}(i)$ holds. Similarly $J_S(1, j)<^-D_{SM}(j)$ is obtained for $^-D_{SM}$.

$^-D_{SM}(j)=R(i, j)-D_{MS}(i)<=>D_{MS}(i)=R(i, j)-^-D_{SM}(j)$ directly holds from the definition of RTT. Since $J_S(1, j)<^-D_{SM}(j)(J_S(1, j)>0)$, $^-D_{MS}(i)<R(i, j)-J_S(1, j)$ is obtained.

The present inventor shows Equation (6)→Property 2. Since $^-D_{MS}(k)=^-D_{MS}(i)-J_M(k, i)$, $(J_M(k, i)>0)$, $^-D_{MS}(k)>0$ is obtained due to the first inequality of Equation (6). The second inequality and the equality in Equation (6) give $^-D_{SM}(j)>J_S(1, j)$. Due to $^-D_{SM}(1)=^-D_{SM}(i)-J_S(1, j)$, $(J_S(1, j)>0)$, $^-D_{SM}(1)>0$ is obtained. Since $^-D_{MS}(k)$ and $^-D_{SM}(1)$ are the respective minimum values, $^-D_{MS}(u)>0$ and $^-D_{SM}(v)>0$ hold for $n_1\leq\forall u\leq n_p$, $m_1\leq\forall v\leq m_1$.

From theorem 5, the one-way delay can be computed based on the difference from arbitrary reliable RTT R(i, j).

(Corollary 6)

A similar situation to theorem 5 is considered and the same symbols are used. Fix a value $D_{MS}(i)$ satisfying the valid range of theorem 5. This implies $D_{SM}(j)=R(i, j)-D_{MS}(i)$. Then for given u, v $(n_1\leq u\leq n_p, m_1\leq v\leq m_p)$, $$D_{MS}(u) = D_{MS}(i) + J_M(i, u)$$
$$D_{SM}(v) = D_{SM}(j) + J_S(j, v)$$

and $D_{MS}(u)$ and $D_{SM}(v)$ can be calculated based on the pair (i, j).

One-Way Delay Calculation for Rate Adjustment

In order to both correct a frequency offset and to detect changes in upstream/downstream one-way delay, we use the combination of the existing method and corollary 6. First the following definitions are introduced.

Definition 7

The minimum reliable RTT in a given time (duration) $I_{temp}$ backwards from the current time t, namely TMR(t, $I_{temp}$), is called a temporary minimum round-trip time, or temporary minimum RTT.

$$TMR(t, I_{temp}) =$$
$$\min\{R(n, m) \mid R(n, m) \text{ is reliable, and } t - I_{temp} \leq t_{1,M}(n) \leq t\}.$$

For example, the temporary minimum RTT for $I_{temp}$=1 minute indicates the minimum value of reliable RTTs calculated within one minute in the past from the current time.

Generally, for the temporary minimum RTT, the queuing delays of intermediate devices in both the upstream and the downstream were likely to become minimum. Thus in cases in which both upstream and downstream routes are the same, then a delay value thereof is close to a value arrived at from distributing the temporary minimum RTT at the upstream-downstream ratio of the specification of the network type. For example, conceivably the upstream-downstream ratio on a wired LAN is about 1:1, and is upstream:downstream=a:b and a<b in a mobile network.

A Sync temporary delay base is calculated from the temporary minimum RTT.

12

(Definition 8)

Suppose that the delay ratio downstream (Sync side): upstream (Delay_Req side) of a network specification between a master and a slave is a:b, then temporary delay bases based on the temporary minimum RTT are:

$$TD_{MS}(t, I_{temp}) = \frac{a}{a+b}TMR(t, I_{temp})$$
$$TD_{SM}(t, I_{temp}) = \frac{b}{a+b}TMR(t, I_{temp})$$

wherein $TD_{MS}$ is called a Sync temporary delay base, and $TD_{SM}$ is called a Delay_Req temporary delay base.

Note that the calculation of a reliable RTT is hardly affected by frequency offset of the clock to the master even if the temporary delay bases are calculated from reliable RTTs.

Next, consider a method for calculating the current one-way delay from the temporary delay base. A rate adjustment value of the slave is the sum of a time offset elimination portion $r_P(t)$ and a frequency offset $r_f(t)$. Suppose that the frequency offset at time t matches the master, then we can recognize that the clock of the slave works with the following rate adjustment value:

$$r_T(t) = \frac{r_P(t)}{1 + r_f(t)}.$$

Figure 6:
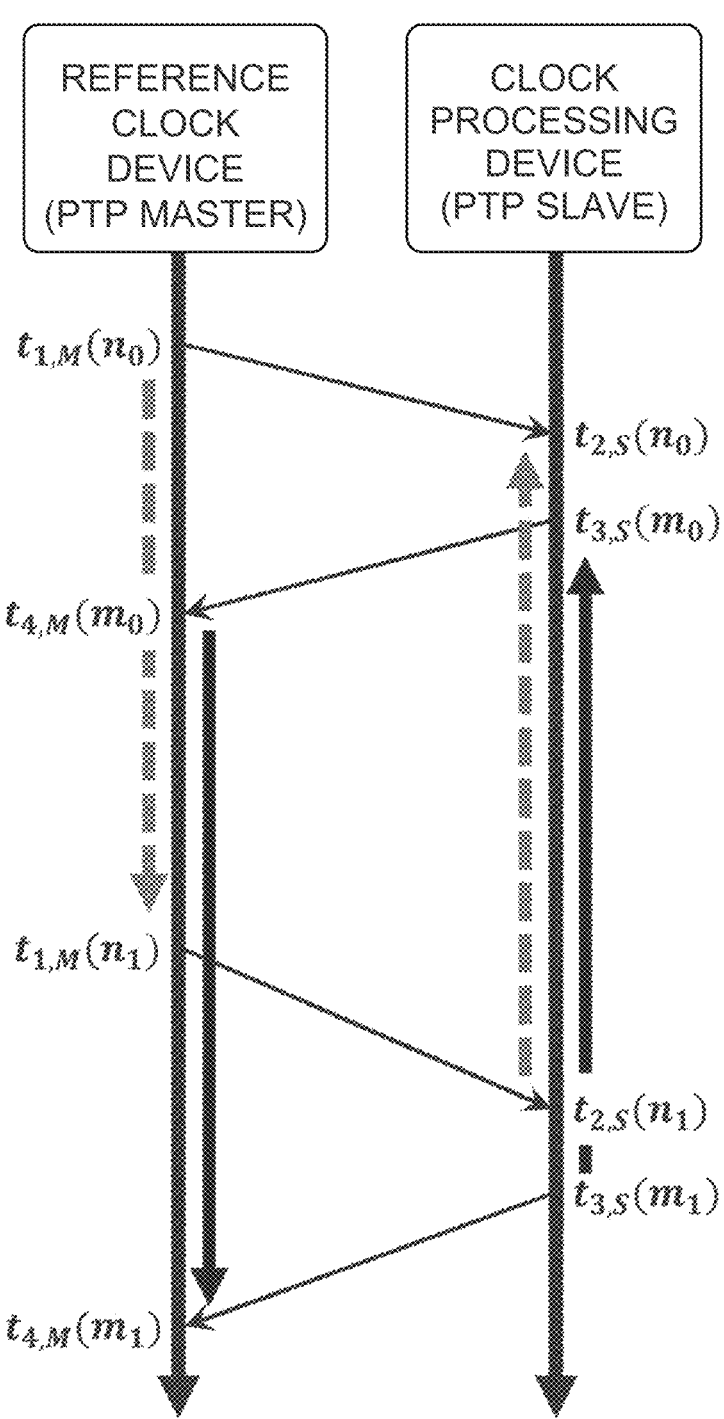
FIG. 6 is a diagram illustrating the passage of transmission/reception times for each message.

Consider the example in FIG. 6.

Suppose R($n_0$, $m_0$) is the temporary minimum RTT. Furthermore, suppose that rate adjustment at the slave was not changed at any time t in an interval from $t_{2,S}(n_0)$ to $t_{3,S}(m_1)$, and $r_f(t)$ matches the master. In such circumstances, $$t_{2,M}(n_1) - t_{2,M}(n_0) = \frac{t_{2,S}(n_1) - t_{2,S}(n_0)}{1 + r_T(t)}$$
$$t_{3,M}(n_1) - t_{3,M}(n_0) = \frac{t_{3,S}(n_1) - t_{3,S}(n_0)}{1 + r_T(t)}$$

hold for the time from $t_{2,S}(n_0)$ to $t_{2,S}(n_1)$ and for the time from $t_{3,S}(n_0)$ to $t_{3,S}(n_1)$. Since the frequency offset matches, it is a reliable period of time, and so a reliable one-way delay difference can be calculated as follows.

$$J_M(n_0, n_1) = \frac{t_{2,S}(n_1) - t_{2,S}(n_0)}{1 + r_T(t)} - (t_{1,M}(n_1) - t_{1,M}(n_0)) \quad (7)$$
$$J_S(m_0, m_1) = (t_{4,M}(m_1) - t_{4,M}(m_0)) - \frac{t_{3,S}(m_1) - t_{3,S}(m_0)}{1 + r_T(t)}$$

The temporary delay bases can then also be respectively calculated:

$$D_{MS}(n_0) = \frac{a}{a+b}R(n_0, m_0) \quad (8)$$
$$D_{SM}(m_0) = \frac{b}{a+b}R(n_0, m_0)$$

If the R($n_1$, $m_1$) is not the new temporary minimum RTT, namely R($n_1$, $m_1$)>R($n_0$, $m_0$) is satisfied and $t_{2,S}(n_0)$ is in the valid period starting from $t_{3,S}(m_1)$, then one-way delays based on the temporary delay base can be calculated at the $n_1$th and $m_1$th time points using corollary 6 as:

$$\hat{D}_{MS}(n_1) = D_{MS}(n_0) + J_M(n_0, n_1) \text{ and} \qquad (9)$$

$$\hat{D}_{SM}(m_1) = D_{SM}(m_0) + J_S(m_0, m_1).$$

However, in practice a frequency offset $r_1$ is not necessarily correct. Furthermore, it is not able to know any change in the master-slave clock offset as described above even if this result can be used. Thus the upstream/downstream transmission delays are decided by proportionally distributing the $R(n_1, m_1)$ with reference to the results of $\hat{D}_{MS}(n_1)$ and $\hat{D}_{SM}(m_1)$.

(Algorithm 9 (OWD Approximation))

Suppose the current time is t with t=max $\{t_{2,S}(n_1), t_{3,S}(m_1)\}$. Suppose that the temporary minimum RTT for time period $I_{temp}$ is TMR(t, $I_{temp}$)=R($n_0$, $m_0$). Thus $D_{MS}(n_0)$=TD$_{MS}$(t, $I_{temp}$) and $D_{SM}(m_0)$=TD$_{SM}$(t, $I_{temp}$). Moreover, suppose that $R(n_1, m_1)$ is reliable. In such cases, the $n_1$th Sync one-way delay $D_{MS}(n_1)$ and the $m_1$th Delay-Req one-way delay $D_{SM}(m_1)$ are calculated by the following steps.

1) The one-way delay difference is calculated by Equation (7), and a reference value $\hat{D}_{MS}(n_1)$ of the $n_1$th Sync message one-way delay and a reference value $\hat{D}_{SM}(m_1)$ of the $m_1$th Delay_Req message one-way delay are calculated according to Equation (9).

2) A reduction constant $C_{err}$ is given such that min $\{\hat{D}_{MS}(n_1), \hat{D}_{SM}(m_1)\} > C_{err} > 1$ is satisfied. Fractions of $\hat{D}_{MS}(n_1)/C_{err}$ and $\hat{D}_{SM}(m_1)/C_{err}$ are rounded up or down to the nearest integer. Namely:

$$A = \left\lfloor \frac{\hat{D}_{MS}(n_1)}{C_{err}} + 0.5 \right\rfloor \qquad (10)$$

$$B = \left\lfloor \frac{\hat{D}_{SM}(m_1)}{C_{err}} + 0.5 \right\rfloor$$

The reduction constant here is a constant employed to simplify a first one-way delay reference value and a second one-way delay reference value.

3) Suppose, for a reliable RTT $R(n_1, m_1)$, $$D_{MS}(n_1) = \frac{A}{A + B} R(n_1, m_1) \qquad (11)$$

$$D_{SM}(m_1) = \frac{B}{A + B} R(n_1, m_1)$$

Prior to explaining the present algorithm, note the clock stability as follows. A feedback loop for rate adjustment in a PTP is operated discretely and, for example, is operated at intervals of about 1 second. Namely, the rate of the slave clock is fixed for a given setting and the proceeds at the rate continuously for one second. In cases in which the stability of the internal clock of the slave is 5 ppm, then there is a possibility that a clock deviates the maximum of 5 microseconds in one second. If the adjustment of frequency offset is working then this deviation will be smaller and, for example, is suppressed to an order of about 1 microsecond.

Explanation follows regarding the present algorithm using specific values. Suppose that the time stamp and calculation of the one-way delay difference in the algorithm is performed in nanosecond units, and that the calculation results from the time stamps are:

$$D_{MS}(n_0) = 2,000,000 \text{ (nanoseconds)}$$
$$D_{SM}(m_0) = 2,000,000 \text{ (nanoseconds)}$$
$$J_M(n_0, n_1) = 350,620 \text{ (nanoseconds)}$$
$$J_S(m_0, m_1) = -420 \text{ (nanoseconds)}$$
$$R(n_1, m_1) = 4,350,250 \text{ (nanoseconds)}.$$

Here, it is assumed that the upstream/downstream one-way delays are symmetrical and that the temporary minimum RTT $R(n_0, m_0)$ is proportionally distributed 1:1. Next from step 1):

$$\hat{D}_{MS}(n_1) = 2350620$$
$$\hat{D}_{SM}(m_1) = 1999580.$$

In cases in which the passage of time from when $R(n_0, m_0)$ was acquired to when $R(n_1, m_1)$ was acquired is about 1 second, then as noted above, deviation of the slave clock may be thought of as being of the order of not more than ±1 microsecond. Thus, by setting the reduction constant $C_{err}$, for example, to 2,000 (nanoseconds), an upstream/downstream reference ratio is calculated that takes into consideration an increase in a greatly fluctuating Sync one-way delay which is more than the deviation in the clock.

$$A = \left\lfloor \frac{2350620}{2000} + 0.5 \right\rfloor = 1175$$

$$B = \left\lfloor \frac{1999580}{2000} + 0.5 \right\rfloor = 1000$$

Finally, respective one-way delays are obtained by proportionally distributing $R(n_1, m_1)$ at a ratio of 1175:1000=47:40.

$$D_{MS}(n_1) = \frac{47}{87} R(n_1, m_1) \approx 2350135.05 \text{ (nanoseconds)}$$

$$D_{SM}(m_1) = \frac{40}{87} R(n_1, m_1) \approx 2000114.94 \text{ (nanoseconds)}$$

In the existing calculation methods, the $R(n_1, m_1)$ has been proportionally distributed at 1:1, and so $D_{MS}(n_1)$=$D_{SM}(m_1)$=2,175,125 (nanoseconds), however this is likely to wrong by 100 microseconds or more compared to the true value.

In this example the reduction constant $C_{err}$ is decided from the clock stability, however a different way to decide it may be adopted. For example, in cases where a clock stability is about 0.01 ppm but a clock synchronization precision of about 1 microsecond is acceptable, the reduction constant may adopt a larger value such as $C_{err}$=1000.

Finally, the present algorithm controls the result by changing a valid time period $I_{temp}$ of the temporary delay base and the reduction constant $C_{err}$. In particular, if the valid time period is set to 0 then the temporary delay base is calculated for every reliable RTT calculation. Namely, calculation of the temporary delay base is the same as an existing one-way delay calculation.

<Inspection and Correction of One-Way Delay>

As described above, when a frequency offset of the slave clock is appropriately maintained, the period during which the one-way delay difference can be reliable for Theorem 5 can be made longer.

As the reliable period in Theorem 5 is longer, there is a higher possibility that the minimum one-way delay can be updated, and the information can be used for a longer period. Therefore, the information on the valid range of the one-way delay obtained in Theorem 5 is used for verification and correction of an estimation result of the one-way delay.

(Algorithm (OWD Check and Correct))

Assume that a current time is t, $t=\max\{t_{2,S}(n_1), t_{3,S}(m_1)\}$, and a delay ratio of a downstream delay and an upstream delay used for estimation of a one-way delay is a:b. Furthermore, the one-way delay difference used in Theorem 5 is calculated together with the rate of the slave as in Equation (12). Here, $r_T(t)$ is a rate adjustment value, and is expressed by $r_T(t)=r_P(t)/(1+r_f(t))$ using a time difference reducing rate $r_P(t)$ and an intrinsic rate $r_f(t)$ to be described later.

$$J_M(n_0, n_1) = \frac{t_{2,S}(n_1) - t_{2,S}(n_0)}{1 + r_T(t)} - (t_{1,M}(n_1) - t_{1,M}(n_0)) \quad (12)$$

$$J_S(m_0, m_1) = (t_{4,M}(m_1) - t_{4,M}(m_0)) - \frac{t_{3,S}(m_1) - t_{3,S}(m_0)}{1 + r_T(t)}$$

Then, the one-way delay of the Sync message is checked and corrected by the following procedure.

1) Execute one-way delay estimation process to calculate $D_{MS}(n_1)$ and $D_{SM}(m_1)$.
2) Calculate a valid range of the true one-way delay $^-D_{MS}(n_1)$ using Theorem 5.
3) Output $D_{MS}(n_1)$ as the one-way delay of the $n_1$th Sync message in a case where $D_{MS}(n_1)$ is included in the valid range of 2), and the process ends. When it is not included in the valid range, the process goes to the next procedure.
4) Change the downstream and upstream delay ratio a:b used for estimating the one-way delay so that $D_{MS}(n_1)$ is included in the valid range of 2). Set the changed ratio to a:b, and go to Procedure 1).

Procedures 2) and 3) are referred to as a check phase, and Procedure 4) is referred to as a correct phase.

In this algorithm, an optimal correction method of the delay ratio a:b for estimating the one-way delay is not described, but for example, the following simple procedure can be used. First, suppose that $U<^-D_{MS}(n_1)<V$ is the valid range of the true one-way delay of the Sync message according to Theorem 5, and $D_{MS}(n_1)$ is the estimation result of the one-way delay.

1) Set a+1:b as a new delay ratio a:b, when $D_{MS}(n_1)\leq U$.
2) Set a:b+1 as a new delay ratio a:b, when $V\leq D_{MS}(n_1)$.

The above procedure is repeated until $U<D_{MS}(n_1)<V$ is satisfied.

<System Configuration of Embodiment of Present Disclosure>

Figure 7:
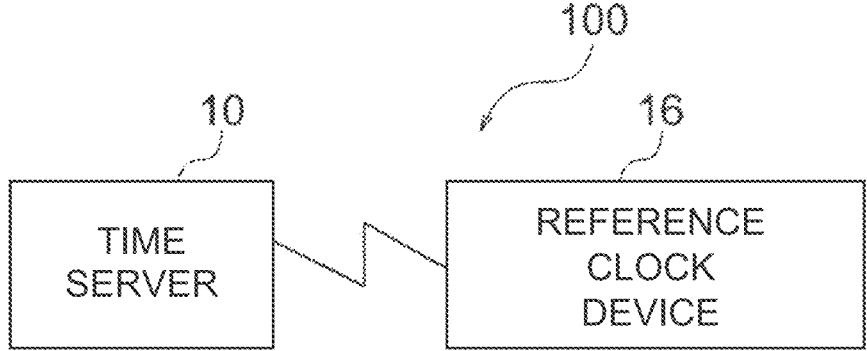
FIG. 7 is a diagram illustrating an example of a clock adjustment system according to an embodiment of the present disclosure.

A configuration of a clock adjustment system according to an embodiment of the present disclosure will be described. As illustrated in FIG. 7, the clock adjustment system 100 according to the embodiment of the present disclosure includes a clock processing device 10 and a reference clock device 16, and the clock processing device 10 and the reference clock device 16 are connected via a network.

The reference clock device 16 is a server device that transmits time information of a reference clock. Although a specific aspect of the reference clock device 16 will not be described, the reference clock device 16 includes a reference clock and distributes time information of the reference clock via a network.

Figure 8:
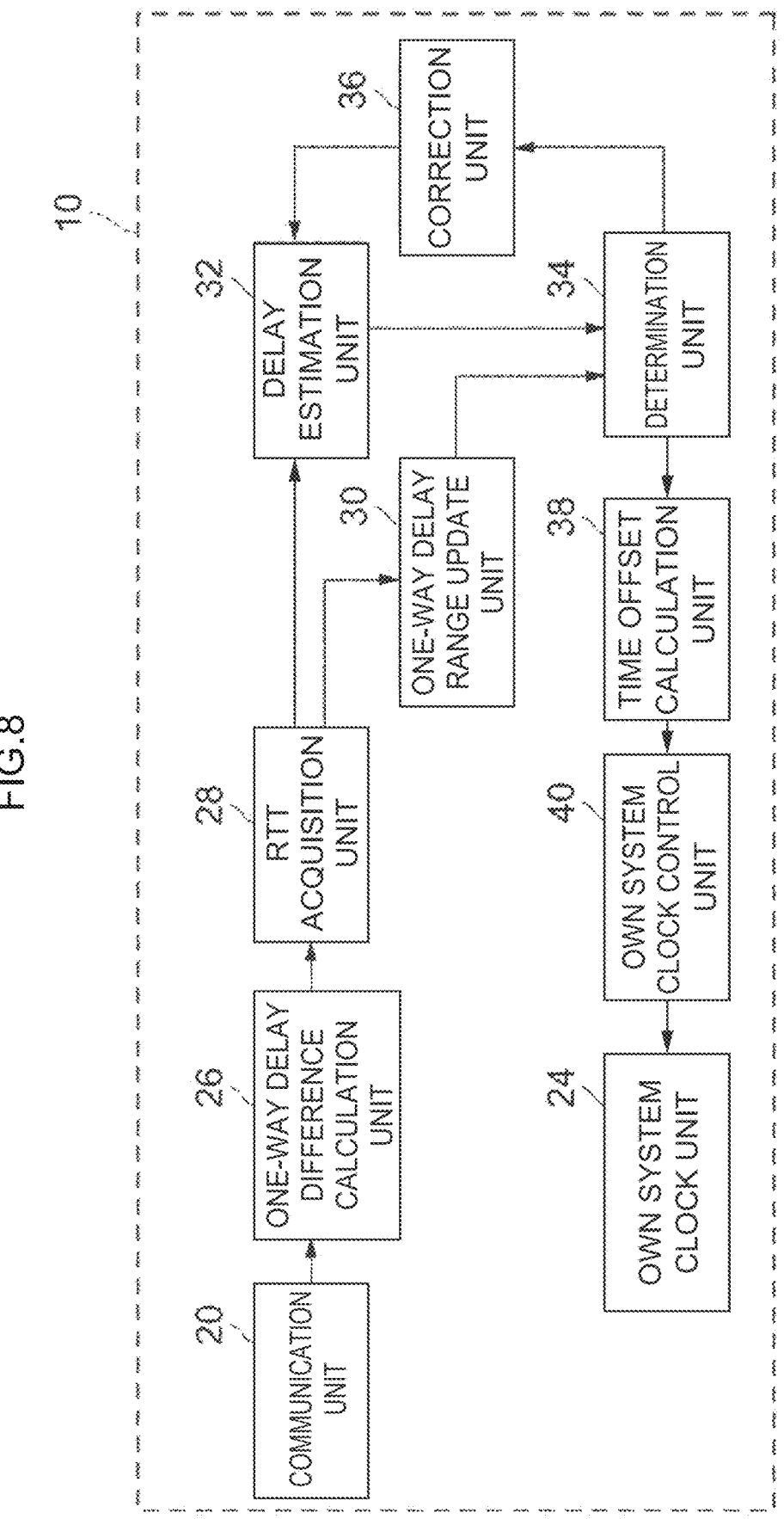
FIG. 8 is a block diagram illustrating a component of a clock processing device according to an embodiment of the present disclosure.

The clock processing device 10 according to the present embodiment can be configured by a computer including a CPU, a RAM, and a ROM storing programs and various data for executing various processing routines to be described later. As functionally illustrated in FIG. 8, the clock processing device 10 includes a communication unit 20, an own system clock unit 24, a one-way delay difference calculation unit 26, an RTT acquisition unit 28, a one-way delay range update unit 30, a delay estimation unit 32, a determination unit 34, a correction unit 36, a time offset calculation unit 38, and an own system clock control unit 40. Note that the RTT acquisition unit 28 is an example of a round-trip delay calculation unit, and the own system clock control unit 40 is an example of a rate determination unit.

The communication unit 20 transmits and receives a message to and from the reference clock device 16 via a network.

Specifically, the communication unit 20 receives the first message (Sync message) including time information of the reference clock from the reference clock device 16. The communication unit 20 transmits the second message (Delay_Req message) including the time information of the own system clock unit 24 to the reference clock device 16. The communication unit 20 receives the third message (Delay-_Resp message) including time information of the reference clock at the time of receiving the second message from the reference clock device 16.

The own system clock unit 24 determines time information of the own clock on the basis of the current rate, and outputs the time information to the communication unit 20. Note that the own system clock unit 24 is an example of a clock unit.

Furthermore, in a case where distributing the time information of the own clock to a client terminal is considered as an application, the time information of the own clock output from the own system clock unit 24 is transmitted to the client terminal via a network.

The one-way delay difference calculation unit 26 sets, as a temporary first one-way delay, a difference between the time information of the reference clock included in the Sync message and the time information of the own system clock unit 24 when the Sync message is received. The one-way delay difference calculation unit 26 calculates a first one-way delay difference that is a difference between the temporary first one-way delays. The one-way delay difference calculation unit 26 sets, as a temporary second one-way delay, a difference between the time information included in the Delay_Req message and the time information of the reference clock, included in the Delay_Resp message, when the Delay_Req message is received. The one-way delay difference calculation unit 26 calculates a second one-way delay difference that is a difference between the temporary second one-way delays.

Specifically, the Sync message and the Delay_Req message (Delay_Resp message) are transmitted and received asynchronously, and the time stamps $t_{1,M}$ and $t_{2,S}$ can be acquired when the Sync message is received, and the time stamps $t_{3,S}$ and $t_{4,M}$ can be acquired when the Delay_Resp message is received. The one-way delay difference calculation unit 26 operates at the timing of receiving each message. A one-way delay difference corresponding to each message is calculated, and a result is temporarily stored. The stored calculation result is used in subsequent process.

The procedure is summarized as follows.

1) Execute the following steps a) to c) in a case where the received message is a Sync message($t_{1,M}(n)$, $t_{2,S}(n)$).

a) Calculate the first one-way delay difference $J_M(n-1, n)$ by the method of the above Equation (7) with reference to the current rate information $r_P$ and $r_f$.

b) Store the first one-way delay difference $J_M(n-1, n)$.

c) Input $t_{1,M}(n)$ and $t_{2,S}(n)$ to the RTT acquisition unit 28, and the processing of the one-way delay difference calculation unit 26 is ended.

2) Execute the following steps a) to c) in a case where the received message is a Delay_Req message($t_{3,S}(m)$, $t_{4,M}(m)$)

a) Calculate the second one-way delay difference $J_S(m-1, m)$ by the method of the above Equation (12) with reference to the current rate information $r_P$ and $r_f$.

b) Store the second one-way delay difference $J_S(m-1, m)$.

c) Input $t_{3,S}(m)$ and $t_{4,M}(m)$ to the RTT acquisition unit 28, and the processing of the one-way delay difference calculation unit 26 is ended.

The RTT acquisition unit 28 acquires information for calculating RTT, which is the sum of the first one-way delay and the second one-way delay, using a combination of the Sync message, the Delay_Req message, and the Delay_Resp message to be calculated. The RTT acquisition section 28 calculates the RTT. Note that RTT is an example of a round-trip delay.

Specifically, whether the RTT is reliable is checked using the time stamp information of the received message.

In the PTP, since the Sync message($t_{1,M}(n)$, $t_{2,S}(n)$) is fundamental information of time information, a reliable RTT is calculated from time stamps ($t_{3,S}(m-1)$, $t_{4,M}(m-1)$) and ($t_{3,S}(m)$, $t_{4,M}(m)$) of preceding and subsequent Delay_Req messages with reference to $t_{1,M}(n)$, $t_{2,S}(n)$.

Since these are the preceding and subsequent Delay_Req messages, $t_{3,S}(m-1) < t_{2,S}(n) < t_{3,S}(m)$ is satisfied. At this time, by using smaller one of time stamp information $$G_p = t_{2,S}(n) - t_{3,S}(m-1)$$

$$G_r = t_{3,S}(m) - t_{2,S}(n),$$

the reliable RTT is calculated. For example, when $G_f < G_p$, the reliable RTT is calculated using $t_{1,M}(n)$, $t_{2,S}(n)$, $t_{3,S}(m)$, and $t_{4,M}(m)$. In practice, as the time stamp information is used in subsequent process, $t_{1,M}(n)$, $t_{2,S}(n)$, $t_{3,S}(m)$, and $t_{4,M}(m)$ are input to the one-way delay range update unit 30 and the delay estimation unit 32. Note that the RTT may also be calculated and input by the RTT acquisition unit 28, or the RTT may be calculated in the subsequent process.

Here, in order to make the RTT reliable, it is not sufficient to simply take time stamps near $t_{2,S}(n)$, and it is also necessary to consider a length of $G_f$ (or $G_p$). Therefore, it is preferable that a user can set a maximum value of $G_f$. Furthermore, since the Sync message and the Delay_Req message are received asynchronously, not all time stamps near $t_{2,S}(n)$ are provided. Therefore, the received time stamp information is temporarily stored until the necessary information is obtained, and the processing is ended unless $t_{1,M}(n)$, $t_{2,S}(n)$, $t_{3,S}(m)$, and $t_{4,M}(m)$ by which the reliable RTT can be calculated are obtained.

The procedure is summarized as follows.

1) In a case where the reception time stamps are $t_{1,M}(n)$ and $t_{2,S}(n)$, store both the time stamps as $T_1$ and $T_2$, respectively, the processing of the RTT acquisition unit 28 ends, and the process does not go to the subsequent step.

2) In a case where the reception time stamps are $t_{3,S}(m)$ and $t_{4,M}(m)$, read the latest stored $T_1$, $T_2$, $T_3$, and $T_4$ as $t_{1,M}(n)$, $t_{2,S}(n)$, $t_{3,S}(m-1)$, and $t_{4,M}(m-1)$ respectively.

a) Overwrite $T_3$ with $t_{3,S}(m)$, and overwrite $T_4$ with $t_{4,M}(m)$.

b) In the case of $t_{2,S}(n) \leq t_{3,S}(m-1) \leq t_{3,S}(m)$, the processing of the RTT acquisition unit 28 is ended, and the process does not go to the subsequent step.

c) In the case of $t_{3,S}(m-1) \leq t_{2,S}(n) \leq t_{3,S}(m)$, the following steps i) to iv) are executed.

i) Calculate $G_p = t_{2,S}(n) - t_{3,S}(m-1)$, $G_f = t_{3,S}(m) - t_{2,S}(n)$.

ii) When $G_p < G_f$ and $G_p \leq$(user setting allowable value), input $t_{1,M}(n)$, $t_{2,S}(n)$, $t_{3,S}(m-1)$, and $t_{4,M}(m-1)$ to the one-way delay range update unit 30 and the delay estimation unit 32, and the processing of the RTT acquisition unit 28 is ended.

iii) When $G_p \geq G_f$ and $G_f \leq$(user setting allowable value), input $t_{1,M}(n)$, $t_{2,S}(n)$, $t_{3,S}(m)$, and $t_{4,M}(m)$ to the one-way delay range update unit 30 and the delay estimation unit 32, and the processing of the RTT acquisition unit 28 is ended.

iv) When $\min\{G_p, G_f\} >$(user setting allowable value), the processing of the RTT acquisition unit 28 is ended, and the process does not go to the subsequent step.

The one-way delay range update unit 30 calculates a first one-way delay difference that is a difference between the shortest time of the temporary first one-way delay and the latest temporary first one-way delay, and calculates a second one-way delay difference that is a difference between the shortest time of the temporary second one-way delay and the latest temporary second one-way delay. The one-way delay range update unit 30 updates the valid range of the first one-way delay determined using the information to calculate the RTT acquired by the RTT acquisition unit 28, and the first one-way delay difference and the second one-way delay difference.

Specifically, the information about the valid range of $\bar{D}_{MS}(i)$ of Theorem 5 is updated. It is considered that a one-way delay difference within the past $I_{acc}$ time from the current time is reliable. $I_{acc}$ may be a value set by a user, or may be automatically calculated from a change in a drift value, or the like.

The processing is performed by the following procedure.

1) Find numbers k and 1 at which the first one-way delay $\bar{D}_{MS}(k)$ and the second one-way delay $\bar{D}_{SM}(1)$ are minimum within the past $I_{acc}$ from the stored first one-way delay difference sequence $J_M(n-1, n)$ and second one-way delay difference sequence $J_S(m-1, m)$. In a case where there are a plurality of the minimum values, the larger (newer) number is used.

2) Calculate and store $D_{min}(i, j) = J_M(k, i)$, $D_{max}(i, j) = R(i, j) - J_S(1, j)$ respectively.

3) The processing of the one-way delay range update unit 30 ends. Note that the stored result is referred to and used by the determination unit 34.

Figure 9:
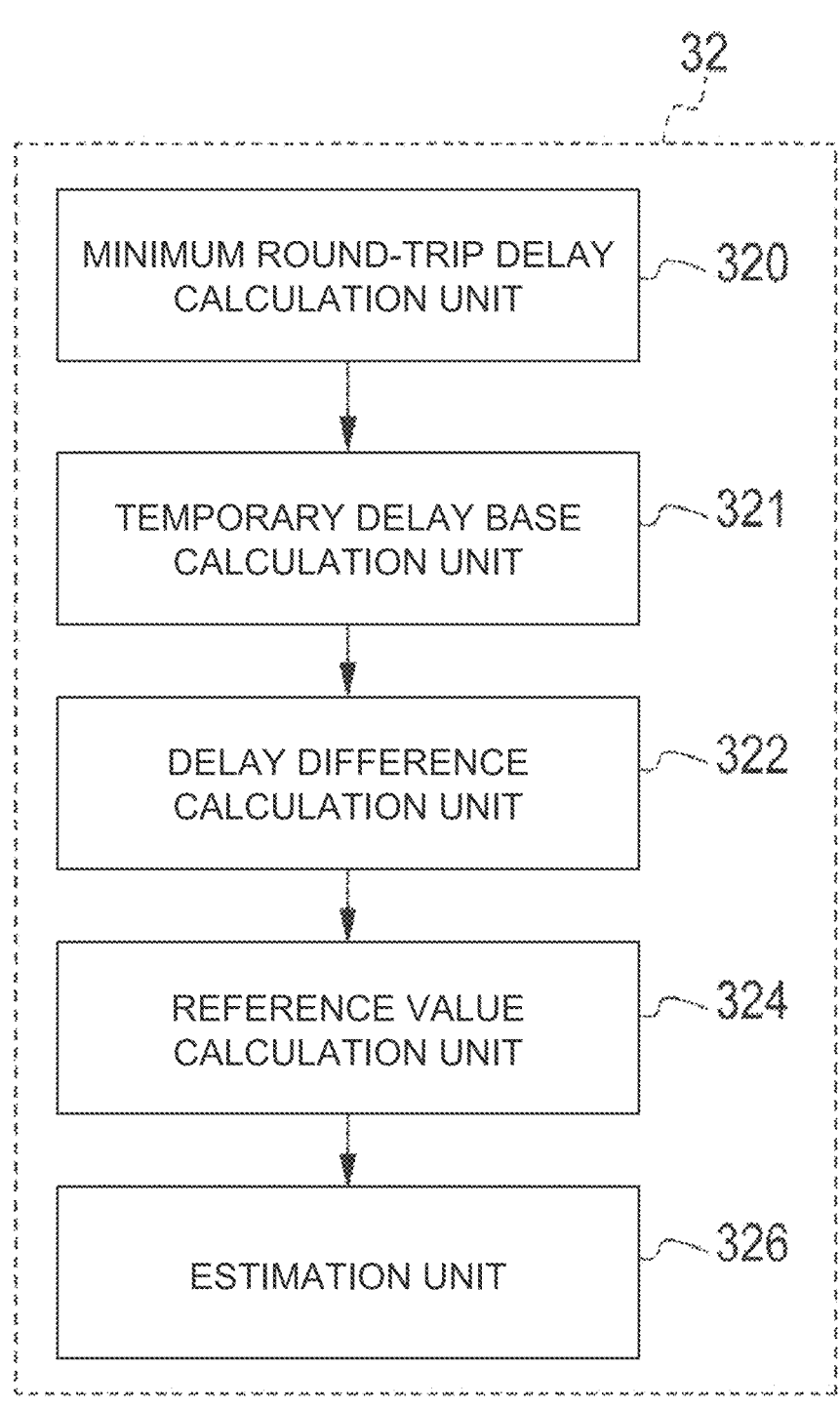
FIG. 9 is a block diagram illustrating a component of a delay estimation unit of the clock processing device according to an embodiment of the present disclosure.

The delay estimation unit 32 estimates a first one-way delay. More specifically, as illustrated in FIG. 9, the delay estimation unit 32 includes the minimum round-trip delay calculation unit 320, a temporary delay base calculation unit 321, a delay difference calculation unit 322, a reference value calculation unit 324, and an estimation unit 326.

If there is an RTT that takes the minimum value of the RTTs calculated by the RTT acquisition unit 28 for within the specific period of time, the minimum round-trip delay calculation unit 320 takes this RTT as the temporary minimum RTT.

For example, if there is the minimum value RTT of the already calculated and stored reliable RTTs for within the specific period of time, the minimum round-trip delay calculation unit 320 takes this as the temporary minimum RTT R(n, m). Otherwise, in cases where there is not even one reliable RTT calculated within the specific period of time, and if a reliable RTT can be calculated for the current time t, then a reliable RTT R(i, j) is calculated from the input time stamps $t_{1,M}(i)$, $t_{2,S}(i)$, $t_{3,S}(j)$, and $t_{4,M}(j)$, and is taken as the temporary minimum RTT R(n, m). The temporary delay base calculation unit 321 calculates, from the temporary minimum RTT, a first temporary delay base that is a first one-way delay and a second temporary delay base that is a second one-way delay, which are component of the temporary minimum RTT.

More specifically, for the temporary minimum RTT, the temporary delay base calculation unit 321 employs a predetermined ratio to calculate the first temporary delay base and the second temporary delay base, which are component of the temporary minimum RTT.

For example, the temporary delay base calculation unit 321 references a predetermined delay ratio a:b, and calculates a first temporary delay base $TD_{MS}$ and a second temporary delay base $TD_{SM}$ using R(n, m) according to Equation (8).

The delay difference calculation unit 322 calculates a first one-way delay difference that is the difference between the first temporary delay base and the first one-way delay, which are both calculated from the target combination of Sync message, Delay_Req message, and Delay_Resp message. The delay difference calculation unit 322 calculates a second one-way delay difference that is the difference between the second delay base and the second one-way delay calculated from the same target combination.

More specifically, for each of a target message combination and the message combination to give the temporary minimum RTT, the delay difference calculation unit 322 calculates the first one-way delay difference, that is the difference between the first temporary delay base and the first one-way delay, and the second one-way delay difference, that is the difference between the second temporary delay base and the second one-way delay, with these calculations being based on time information of the reference clock contained in the Sync message, time information of the own system clock unit 24 when the Sync message was received, time information contained in the Delay_Req message, and time information of the reference clock when the Delay_Req message was received. For example, the first one-way delay difference $J_M(n, i)$ and the second one-way delay difference $J_S(m, j)$ are calculated according to Equation (7).

The reference value calculation unit 324 calculates a reference value of the first one-way delay and a reference value of the second one-way delay according to Equation (9) for the target combination using the first one-way delay difference $J_M(n, i)$, the second one-way delay difference $J_S(m, j)$, and the first temporary delay base and the second temporary delay base as calculated by the delay difference calculation unit 322.

The estimation unit 326 calculates the first one-way delay and the second one-way delay for the target combination using a ratio determined from the first one-way delay reference value and the second one-way delay reference value, and using the RTT obtained from the target combination.

More specifically, the estimation unit 326 decides a first ratio value A, B to calculate the first one-way delay using the first one-way delay reference value, the second one-way delay reference value, and the reduction constant according to the Equation (10).

The estimation unit 326 calculates the first one-way delay for the target combination using the first ratio A/(A+B) and the RTT obtained from the target combination according to Equation (11). For example, the estimation unit 326 calculates the first one-way delay $D_{MS}(i)$ and inputs the first one-way delay $D_{MS}(i)$ and the time stamps $t_{1,M}(i)$, $t_{2,S}(j)$ to the determination unit 34, and the processing of the estimation unit 326 is ended.

The determination unit 34 uses the valid range of the first one-way delay to determine whether or not the first one-way delay estimated by the delay estimation unit 32 is within the valid range.

Here, for the number i, j, it is assumed that the processing of the one-way delay range update unit 30 has been completed ($D_{min}(i, j)$ and $D_{max}(i, j)$ have been calculated.). The processing is performed by the following procedure.

1) In a case where $D_{min}(i, j)<D_{MS}(i)<D_{max}(i, j)$, it is determined that the estimated first one-way delay is within the valid range, input $D_{MS}(i)$, $t_{1,M}(i)$, and $t_{2,S}(j)$ to the time difference calculation unit 38, and the processing of the determination unit 34 ends.

2) In a case where $D_{min}(i, j)<D_{MS}(i)<D_{max}(i, j)$ is not satisfied, it is determined that the estimated first one-way delay is not consistent, and the processing of the determination unit 34 ends.

In a case where the determination unit 34 determines that the estimated first one-way delay is outside the valid range, the correction unit 36 corrects the ratio between the first one-way delay and the second one-way delay.

Specifically, the correction unit 36 updates the ratio a:b used in the delay estimation unit 32 to satisfy $D_{min}(i, j)<D_{MS}(i)<D_{max}(i, j)$, and go to the processing of the delay estimation unit 32. Any method of updating is acceptable. For example, when $D_{MS}(i)≤D_{min}(i, j)$, a+1:b is set to a new ratio a:b. When $D_{max}(i, j)≤D_{MS}(i)$, a:b+1 is set as a new ratio a:b.

Until the determination unit 34 determines that the estimated first one-way delay is within the valid range, the correction by the correction unit 36, the estimation by the delay estimation unit 32, and the determination by the determination unit 34 are repeated.

The time offset calculation unit 38 calculates a current time offset between the time information of the own clock and the time information of the reference clock by using the first one-way delay estimated by the delay estimation unit 32.

For example, the current time offset is calculated according to the following equation.

$O(i)=t_{1,M}(i)+D_{MS}(i)-t_{2,S}(j)$. The calculation result is input to the own system clock control unit 40.

Based on the current time offset $O(t_i)$ as calculated by the time offset calculation unit 38 and on $O(t_{i-1})$ as calculated the previous time, the own system clock control unit 40 updates a time offset reducing rate $r_P(t_i)$ according to the following equation, and also updates a intrinsic rate $r_I(t_i)$ based on the current time offset $O(t_i)$. The time offset reducing rate $r_P(t_i)$ is updated so as to speed up the rate of the own clock when the reference clock is ahead from the own clock, and to slow down the rate of the own clock when
the reference clock is delayed with respect to the own clock.

$$r_P(t_i) - K_{PO}(t_i) + K_D \frac{o(t_i) - o(t_{i-1})}{t_i - t_{i-1}}$$

$$r_I(t_I) = K_I \sum_{k=1}^{i} (t_k - t_{k-1}) o(t_k)$$

Wherein, $t_{i-1}$ is the time when the previous PID control
calculation was executed to determine the rate, and $K_P$, $K_I$,
$K_D$ are gains of the PID control.

The own system clock control unit 40 determines the
current rate $r(t_i)$ of the own clock according to the following
Equation on the basis of the time offset reducing rate and the
intrinsic rate, and outputs the current rate $r(t_i)$ to the own
system clock unit 24.

$$r(t_i) = r_P(t_i) + r_I(t_i)$$

Furthermore, the time offset reducing rate $r_P$ and the
intrinsic rate $r_I$ calculated above are stored for use by the
one-way delay difference calculation unit 26.
<Operation of Embodiment of Present Disclosure>

Next, processing by the clock processing device 10
according to the embodiment of the present disclosure will
be described with reference to FIG. 10. Every time the clock
processing device 10 receives the Sync message or the
Delay_Resp message from the reference clock device 16, the
clock processing device 10 executes a clock control pro-
cessing routine illustrated in FIG. 10.

First, in step S100, in a case where the received message
is a Sync message($t_{1,M}(n)$, $t_{2,S}(n)$), the one-way delay dif-
ference calculation unit 26 inputs the time stamps $t_{1,M}(n)$
and $t_{2,S}(n)$ to the RTT acquisition unit 28.

In a case where the received message is the Delay_Resp
message($t_{3,S}(m)$, $t_{4,M}(m)$), the one-way delay difference
calculation unit 26 inputs the time stamps $t_{3,S}(m)$ and
$t_{4,M}(m)$ to the RTT acquisition unit 28.

In step S102, in a case where the received message is the
Sync message($t_{1,M}(n)$, $t_{2,S}(n)$), the one-way delay difference
calculation unit 26 calculates and stores the first one-way
delay difference $J_M(n-1, n)$ with reference to the current rate
information $r_P$ and $r_I$.

In a case where the received message is the Delay_Resp
message($t_{3,S}(m)$, $t_{4,M}(m)$), the one-way delay difference
calculation unit 26 calculates and stores the second one-way
delay difference $J_S(m-1, m)$ with reference to the current
rate information $r_P$ and $r_I$.

In step S104, the RTT acquisition unit 28 acquires the
time stamps $t_{1,M}(n)$, $t_{2,S}(n)$, $t_{3,S}(m)$, and $t_{4,M}(m)$ using the
combination of the Sync message, the Delay_Req message,
and the Delay_Resp message to be calculated.

In step S106, the one-way delay range update unit 30
calculates the first one-way delay difference and calculates
the second one-way delay difference. Then, the one-way
delay range update unit 30 updates the valid range of the first
one-way delay.

At step S108, the delay estimation unit 32 estimates the
first one-way delay.

Figure 11:
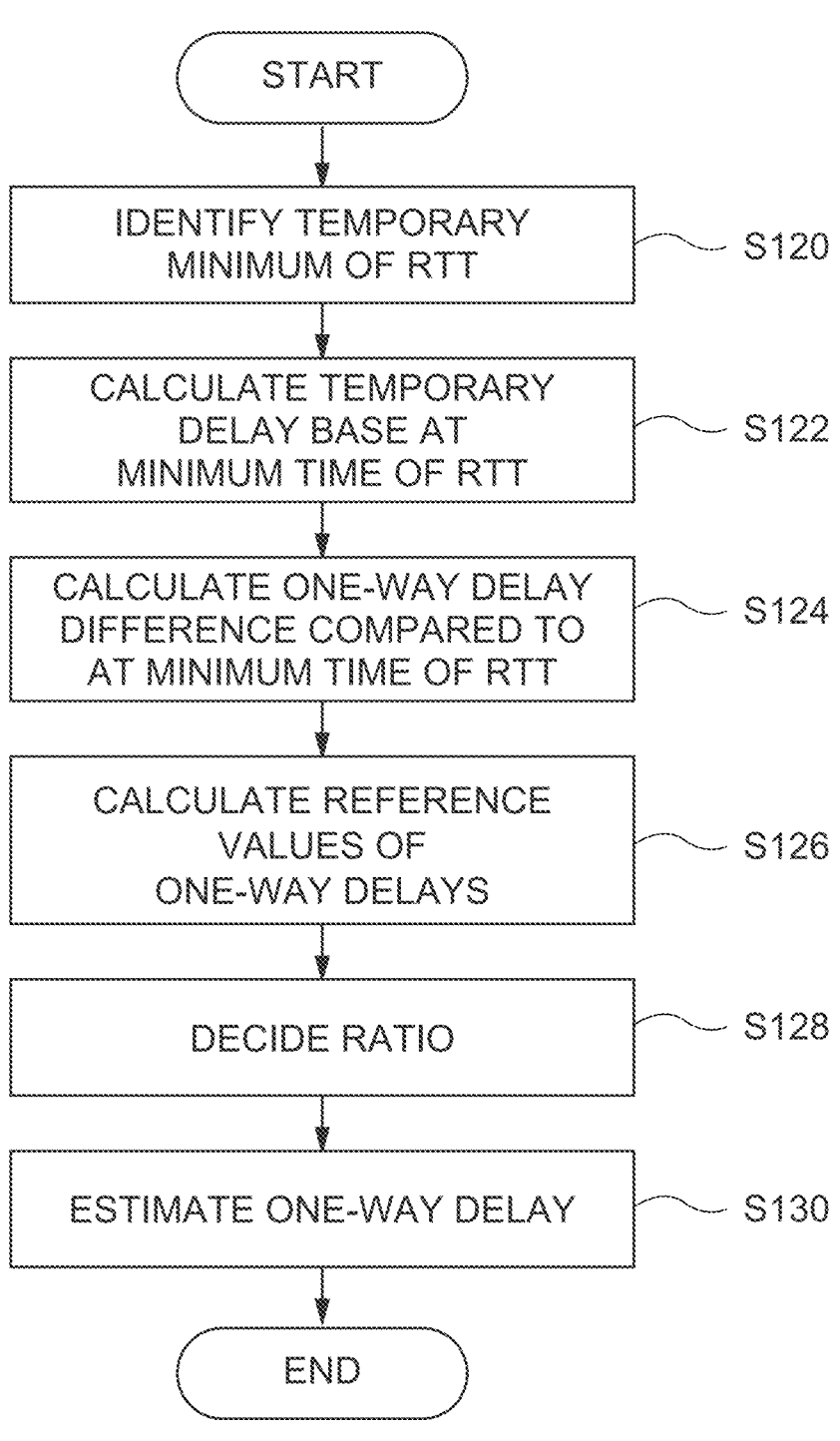
FIG. 11 is a diagram illustrating a flowchart of processing to estimate delays in clock control processing of a clock processing device according to an embodiment of the present disclosure.
Figure 12:
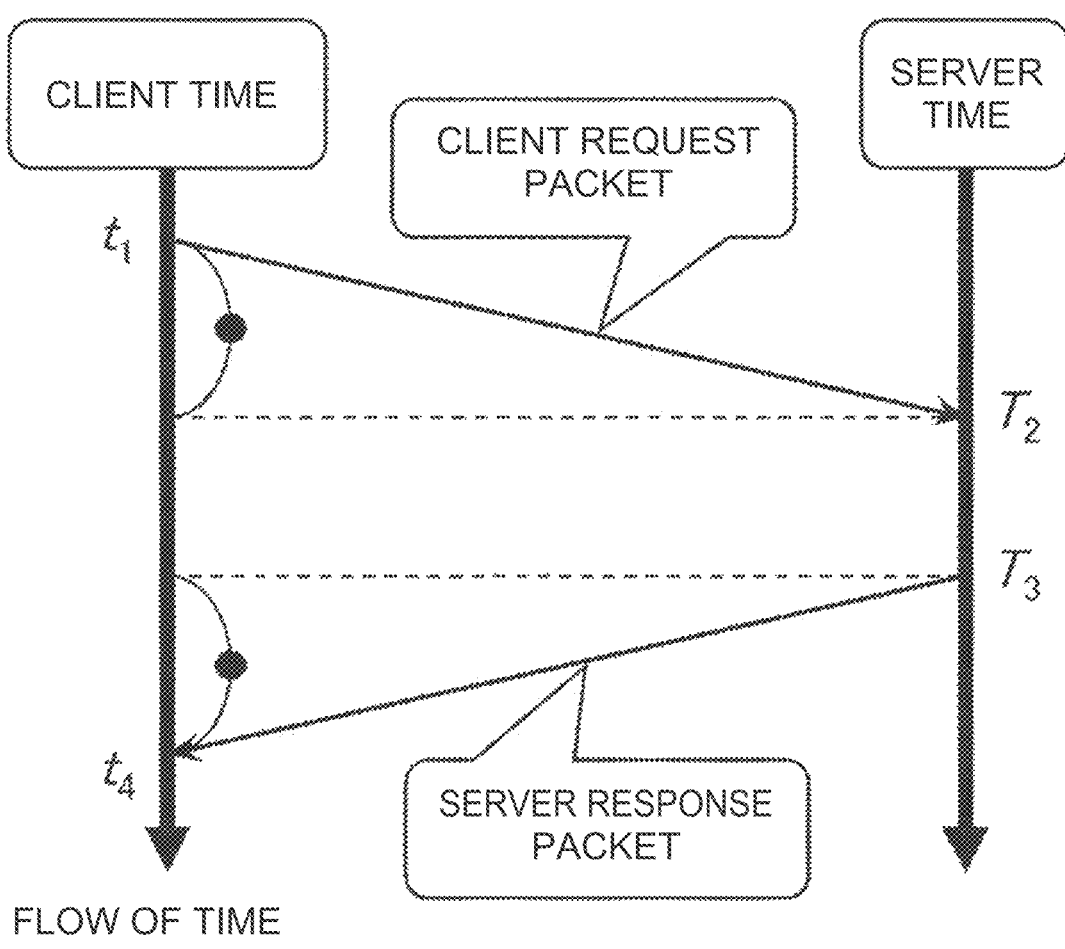
FIG. 12 is a diagram illustrating an example of exchange of time stamps between a server and a client.

Step S108 is implemented by the processing routine
illustrated in FIG. 11.

At step S120, the minimum round-trip delay calculation
unit 320 acquires the temporary minimum RTT R(n, m)
from the already stored RTTs. In a case where the temporary
minimum RTT R(n, m) is not able to be obtained from the
already stored RTTs, a reliable RTT R(i, j) is calculated from
the input time stamps $t_{1,M}(i)$, $t_{2,S}(i)$, $_{3,S}(j)$, $t_{4,M}(j)$, and this is
taken as the temporary minimum RTT R(n, m) if a valid RTT
is able to be calculated for the current time t.

At step S122, the temporary delay base calculation unit
321 refers to a predetermined delay ratio a:b, and calculates
the first temporary delay base $D_{MS}$ and the second temporary
delay base $D_{SM}$ from the temporary minimum RTT R(n, m)
according to above Equation (8).

At step S124, for the target message combination and for
the combination to give the temporary minimum RTT, the
delay difference calculation unit 322 respectively calculates
the first one-way delay difference $J_M(n, i)$ that is the differ-
ence between the first temporary delay base and the first
one-way delay, and the second one-way delay difference
$J_S(m, j)$ that is the difference between the second temporary
delay base and the second one-way delay. These calculations
are based on the time information of the reference clock
contained in the Sync message, on the time information of
the own system clock unit 24 when the Sync message was
received, on the time information contained in the
Delay_Req message, and on the time information of the
reference clock when the Delay_Req message was received.

At step S126, the reference value calculation unit 324
calculates a reference value of the first one-way delay and a
reference value of the second one-way delay according to
Equation (9) for the target combination using the first
one-way delay difference $J_M(n, i)$ and the second one-way
delay difference $J_S(m, j)$ calculated by the delay difference
calculation unit 322, and from the first temporary delay base
and the second temporary delay base.

At step S128, the estimation unit 326 decides a first ratio
value A, B to calculate the first one-way delay using the first
one-way delay reference value, the second one-way delay
reference value, and the reduction constant according to
above Equation (10).

At step S130, the estimation unit 326 calculates a first
one-way delay $D_{MS}(i)$ for the target combination using the
first ratio A/(A+B) and the RTT obtained from the target
calculation, and inputs the first one-way delay $D_{MS}(i)$ and
the time stamps $t_{1,M}(i)$, $t_{2,S}(j)$ to the determination unit 34,
and ends the processing of the estimation unit 326.

Figure 10:
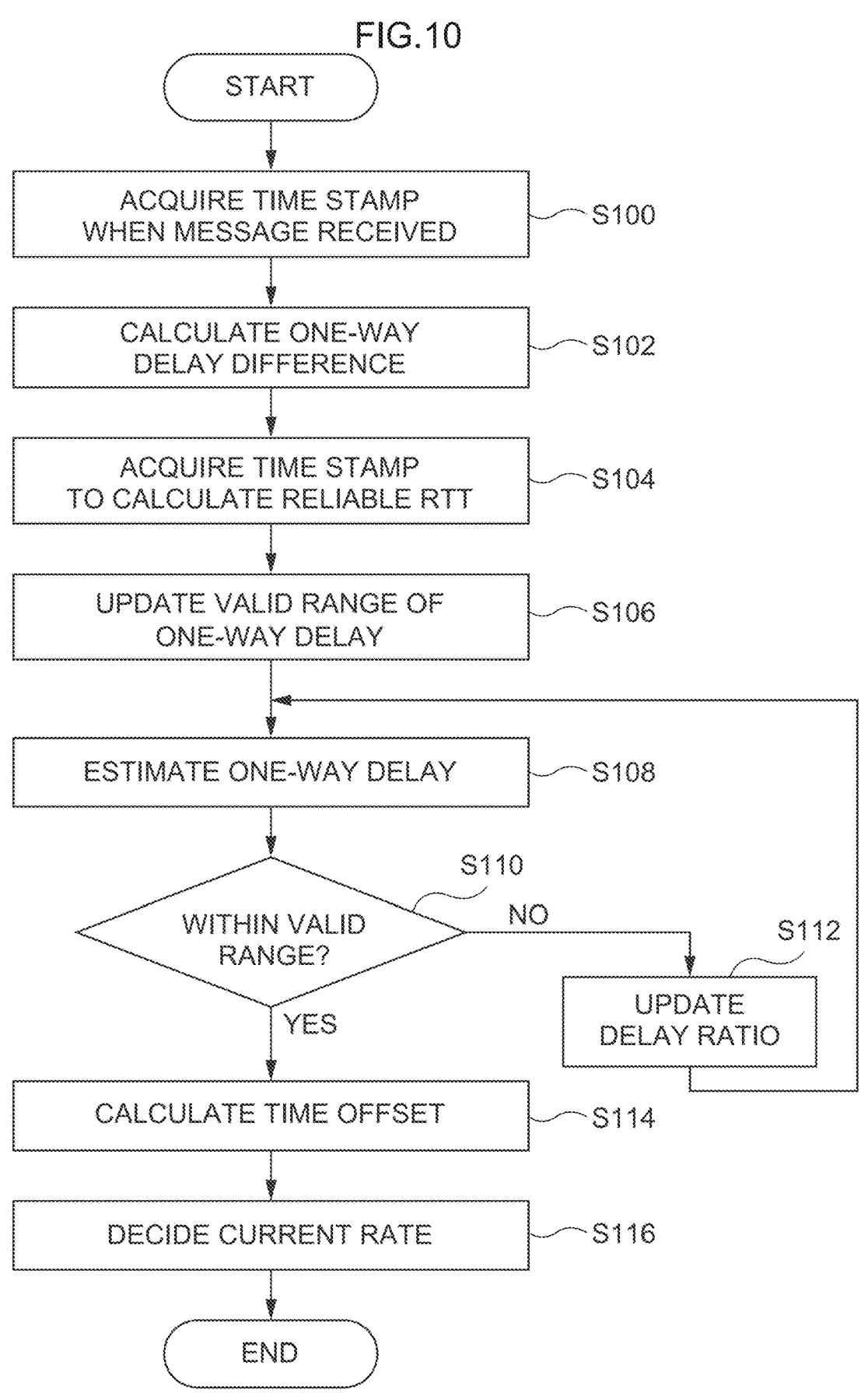
FIG. 10 is a diagram illustrating a flowchart of clock control processing of a clock processing device according to an embodiment of the present disclosure.

In step S110 of FIG. 10, the determination unit 34
determines whether or not the first one-way delay estimated
by the delay estimation unit 32 is within the valid range
using the valid range of the first one-way delay. In a case
where the first one-way delay estimated by the delay esti-
mation unit 32 is within the valid range of the first one-way
delay, the process proceeds to step S114. In a case where the
first one-way delay estimated by the delay estimation unit 32
is out of the valid range of the first one-way delay, the
process proceeds to step S112.

In step S112, in a case where the determination unit 34
determines that the estimated first one-way delay is outside
the valid range, the correction unit 36 corrects the ratio of the
first one-way delay and the second one-way delay, and the
process returns to step S108.

In step S114, the time offset calculation unit 38 calculates
the current time offset between the time information of the
own clock and the time information of the reference clock by
using the first one-way delay finally estimated in step S108.

In step S116, the own system clock control unit 40
updates the intrinsic rate and updates the time offset reducing rate based on the current time offset calculated by the time offset calculation unit 38.

The own system clock control unit 40 determines the current rate $r(t_i)$ of the own clock on the basis of the time offset reducing rate and the intrinsic rate, outputs the current rate $r(t_i)$ to the own system clock unit 24, and ends the clock control processing routine.

As described above, the clock processing device according to the embodiment of the present disclosure calculates the first one-way delay difference that is the difference between the first temporary delay base and the first one-way delay for the target combination, and the second one-way delay difference that is the difference between the second temporary delay base and the second one-way delay for the target combination. The clock processing device calculates the first one-way delay reference value and the second one-way delay reference value from the calculated first one-way delay difference and second one-way delay difference, and from the first temporary delay base and the second temporary delay base respectively. The clock processing device calculates the first one-way delay from a round-trip delay of the target combination and a ratio determined according to the first one-way delay reference value and the second one-way delay reference value. This thereby enables a one-way delay computation with good accuracy even in cases in which the upstream and downstream one-way delays are different.

Moreover, the clock processing device determine whether or not the estimated first one-way delay is within the valid range of the first one way delay that is determined using the first one-way delay difference and the second one-way delay difference. As a result, even in a case where the one-way delay is different between the upstream and the downstream, the one-way delay can be accurately obtained. In addition, the time offset from the reference clock can be accurately obtained using the one-way delay, and the rate of the own clock can be appropriately adjusted.

Note that the present disclosure is not limited to the above embodiment, and various modifications and applications are possible within a range not departing from the spirit of this disclosure.

Although an example has been described in the above embodiment of a case in which the delay estimation unit 32 estimates the first one-way delay and determine whether or not the estimated first one-way delay is within the valid range of the first one-way delay, there is no limitation thereto. For example, the delay estimation unit 32 may estimate the second one-way delay, the one-way delay range update unit 30 may update the valid range of the second one-way delay, and the determination unit 34 may determine whether or not the estimated second one-way delay is consistent using the valid range of the second one-way delay. In this case, the first one-way delay can be read as the second one-way delay by using $^-D_{SM}(j)=R(i,j)-^-D_{MS}(i)$ in the above embodiment.

Supplements

The following supplements are also disclosed with respect to the above embodiment.

Supplement 1

A clock processing device including:

a memory;

at least one processor connected to the memory; and a clock unit that outputs current time information, wherein the processor receives a first message, from a reference clock device, containing time information of a reference clock, transmits, to the reference clock device, a second message containing time information of the clock unit, and receives time information of the reference clock when the reference clock device has received the second message;

as a round-trip delay for every combination of the first message and the second message, calculates a sum of a first one-way delay that is a difference between the time information of the reference clock contained in the first message and the time information of the clock unit when the first message was received, and a second one-way delay that is a difference between the time information contained in the second message and the time information of the reference clock when the second message was received;

calculates a minimum time of the round-trip delay from the calculated round-trip delays;

calculates a first temporary delay base that is a first one-way delay and a second temporary delay base that is a second one-way delay from the combination giving the minimum time of the round-trip delay;

calculates a first one-way delay difference that is a difference between the first one-way delay of a target message combination and the first temporary delay base, and calculates a second one-way delay difference that is a difference between the second one-way delay of the target message combination and the second temporary delay base;

calculates a reference value of the first one-way delay from the calculated first one-way delay difference and the first temporary delay base and calculates a reference value of the second one-way delay from the first temporary delay base and the second temporary delay base; and calculates the first one-way delay or the second one-way delay at the target message combination from the round-trip delay of the target message combination and from a ratio determined according to the first one-way delay reference value and the second one-way delay reference value.

(Supplement 2)

A non-transitory storage medium including a clock unit that outputs current time information, and storing a program executable by a computer to perform clock processing, wherein the clock processing includes:

receiving a first message, from a reference clock device, containing time information of a reference clock, transmitting, to the reference clock device, a second message containing time information of the clock unit, and receiving time information of the reference clock when the reference clock device has received the second message;

as a round-trip delay for every combinations of the first message and the second message, calculating a sum of a first one-way delay that is a difference between the time information of the reference clock contained in the first message and the time information of the clock unit when the first message was received, and a second one-way delay that is a difference between the time information contained in the second message and the time information of the reference clock when the second message was received;

calculating a minimum time of the round-trip delay from the calculated round-trip delays;

calculating a first temporary delay base that is a first one-way delay and a second temporary delay base that is a second one-way delay from the combination giving the minimum time of the round-trip delay;

calculating a first one-way delay difference that is a difference between the first one-way delay of a target message combination and the first temporary delay base, and calculating a second one-way delay difference that is a difference between the second one-way delay of the target message combination and the second temporary delay base;

calculating a reference value of the first one-way delay from the calculated first one-way delay difference and the first temporary delay base and calculating a reference value of the second one-way delay from the first temporary delay base and the second temporary delay base; and calculating the first one-way delay or the second one-way delay at the target message combination from the round-trip delay of the target message combination and from a ratio determined according to the first one-way delay reference value and the second one-way delay reference value.

The entire content of the disclosure of Japanese Patent Application No. 2021-144808 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. A clock processing device, comprising:

a memory;

at least one processor coupled to the memory; and a clock unit that outputs a current time, wherein the at least one processor is configured to:

receive a first message, from a reference clock device, containing a time stamp of a reference clock;

transmit, to the reference clock device, a second message containing a time stamp of the clock unit;

receive a time stamp of the reference clock when the reference clock device has received the second message;

as a round-trip delay for every combination of the first message and the second message, calculate a sum of a downstream one-way delay that is a difference between the time stamp of the reference clock contained in the first message and the time stamp of the clock unit when the first message was received, and an upstream one-way delay that is a difference between the time stamp contained in the second message and the time stamp of the reference clock when the second message was received;

calculate a minimum time of the round-trip delay from the calculated round-trip delays;

calculate a downstream temporary delay base that is a downstream one-way delay and an upstream temporary delay base that is an upstream one-way delay from the combination giving the minimum time of the round-trip delay;

calculate a downstream one-way delay difference that is a difference between the downstream one-way delay of a target message combination and the downstream temporary delay base, and calculate an upstream one-way delay difference that is a difference between the upstream one-way delay of the target message combination and the upstream temporary delay base;

calculate a reference value of the downstream one-way delay from the calculated downstream one-way delay difference and the downstream temporary delay base and calculate a reference value of the upstream one-way delay from the calculated upstream one-way delay difference and the upstream temporary delay base; and calculate the downstream one-way delay or the upstream one-way delay from the round-trip delay of the target message combination and from a ratio determined according to the downstream one-way delay reference value and the upstream one-way delay reference value.

2. The clock processing device of claim 1, wherein the at least one processor is configured to:

determine, as the ratio, a first ratio for calculating the downstream one-way delay and a second ratio for calculating the upstream one-way delay using the downstream one-way delay reference value, the upstream one-way delay reference value, and a reduction constant; and calculate the downstream one-way delay for the target message combination from the first ratio and from the round-trip delay of the same target, or calculate the upstream one-way delay for the target message combination from the second ratio and from the round-trip delay of the same target.

3. The clock processing device of claim 1, wherein:

for the target message combination, and for the message combination where the round-trip delay is a minimum time, respectively, the at least one processor is configured to calculate the downstream one-way delay difference and the upstream one-way delay difference based on a time stamp of a reference clock contained in the first message, a time stamp of the clock unit when the first message has been received, a time stamp contained in the second message, and a time stamp of the reference clock when the second message was received.

4. The clock processing device of claim 1, wherein the at least one processor is configured to calculate the downstream temporary delay base and the upstream temporary delay base time from a minimum time of the round-trip delay and a predetermined ratio.

5. The clock processing device of claim 1, wherein the at least one processor is configured to calculate a current time offset between the clock unit and the reference clock using the estimated downstream one-way delay, a time stamp of the reference clock contained in the first message, and a time stamp of the clock unit when the first message was received; and wherein the at least one processor is configured to determine a current rate for the clock unit based on the current time offset.

6. A non-transitory storage medium storing a program executable by a computer to perform clock processing, the clock processing comprising:

receiving a first message, from a reference clock device, containing a time stamp of a reference clock, transmitting, to the reference clock device, a second message containing a time stamp of a clock unit that outputs a current time, receiving a time stamp of the reference clock when the reference clock device has received the second message;

as a round-trip delay for every combination of the first message and the second message, calculating a sum of a downstream one-way delay that is a difference between the time stamp of the reference clock contained in the first message and the time stamp of the clock unit when the first message was received, and an upstream one-way delay that is a difference between the time stamp contained in the second message and the time stamp of the reference clock when the second message was received;

calculating a minimum time of the round-trip delay from the calculated round-trip delays;

calculating a downstream temporary delay base that is a downstream one-way delay and an upstream temporary delay base that is an upstream one-way delay from the combination giving the minimum time of the round-trip delay;

calculating a downstream one-way delay difference that is a difference between the downstream one-way delay of a target message combination and the downstream temporary delay base, and calculating an upstream one-way delay difference that is a difference between the upstream one-way delay of the target message combination and the upstream temporary delay base;

calculating a reference value of the downstream one-way delay from the calculated downstream one-way delay difference and the downstream temporary delay base and calculating a reference value of the upstream one-way delay from the calculated upstream one-way delay difference and the upstream temporary delay base; and calculating the downstream one-way delay or the upstream one-way delay from the round-trip delay of the target message combination and from a ratio determined according to the downstream one-way delay reference value and the upstream one-way delay reference value.

* * * * *